(12) United States Patent
Bui et al.

(10) Patent No.: US 12,458,491 B2
(45) Date of Patent: Nov. 4, 2025

(54) METHODS TO IMPROVE THE DURABILITY OF POLYMERIC HEART VALVES

(71) Applicants: Ohio State Innovation Foundation, Columbus, OH (US); Georgia Institute of Technology, Atlanta, GA (US); Colorado State University Research Foundation, Fort Collins, CO (US)

(72) Inventors: Hieu Bui, Lithia Springs, GA (US); Lakshmi Prasad Dasi, Dublin, OH (US); Megan Heitkemper, San Jose, CA (US); Susan James, Bellvue, CO (US); Nipa Khair, Fort Collins, CO (US)

(73) Assignees: Ohio State Innovation Foundation, Columbus, OH (US); Georgia Institute of Technology, Atlanta, GA (US); Colorado State University Research Foundation, Fort Collins, CO (US)

( * ) Notice: Subject to any disclaimer, the term of this patent is extended or adjusted under 35 U.S.C. 154(b) by 967 days.

(21) Appl. No.: 17/648,076

(22) Filed: Jan. 14, 2022

(65) Prior Publication Data
US 2022/0133474 A1     May 5, 2022

Related U.S. Application Data

(63) Continuation-in-part of application No. 17/544,194, filed on Dec. 7, 2021, now Pat. No. 12,076,236,
(Continued)

(51) Int. Cl.
*A61F 2/24* (2006.01)

(52) U.S. Cl.
CPC .......... *A61F 2/2418* (2013.01); *A61F 2/2415* (2013.01); *A61F 2/2433* (2013.01); *A61F 2210/0004* (2013.01); *A61F 2240/001* (2013.01)

(58) Field of Classification Search
CPC ............ A61F 2/2418; A61F 2210/0004; A61F 2250/0029
See application file for complete search history.

(56) References Cited

U.S. PATENT DOCUMENTS 3,983,581 A * 10/1976 Angell .................. A61F 2/2409
623/2.15
5,910,170 A * 6/1999 Reimink ............... A61F 2/2418
623/2.38
(Continued)

FOREIGN PATENT DOCUMENTS

JP     2012-504031 A     2/2012
JP     2014-517720 A     7/2014
(Continued)

OTHER PUBLICATIONS

Examination Report issued in Australian patent application No. 2018294423, dated Mar. 21, 2023.
(Continued)

*Primary Examiner* — Suzette J Gherbi
(74) *Attorney, Agent, or Firm* — Benesch Friedlander Coplan & Aronoff LLP

(57) ABSTRACT

A transcatheter prosthetic heart valve includes a stent frame and a leaflet material. The stent frame includes a top portion and a bottom portion. The leaflet material includes a lower portion attached to the stent frame and an upper portion that includes leaflets capable of moving between an open configuration and a closed configuration. At least a portion of the leaflet material weaves through the stent frame. The transcatheter prosthetic heart valve also includes one or
(Continued)

more reinforcement components coupled to the stent frame and/or to the leaflet material to enhance performance of the transcatheter heart valve.

20 Claims, 23 Drawing Sheets

Related U.S. Application Data which is a continuation of application No. 16/625,456, filed as application No. PCT/US2018/040421 on Jun. 29, 2018, now Pat. No. 11,224,509.

(60) Provisional application No. 62/565,709, filed on Sep. 29, 2017, provisional application No. 62/527,640, filed on Jun. 30, 2017.

(56) References Cited

U.S. PATENT DOCUMENTS

| | | | | |
|---|---|---|---|---|
| 6,117,169 | A * | 9/2000 | Moe | A61F 2/2412 |
| | | | | 623/2.12 |
| 6,440,164 | B1 * | 8/2002 | DiMatteo | A61F 2/2475 |
| | | | | 623/2.18 |
| 6,726,715 | B2 | 4/2004 | Sutherland | |
| 8,302,607 | B2 | 11/2012 | Pierce et al. | |
| 8,403,983 | B2 | 3/2013 | Quadri et al. | |
| 9,339,382 | B2 | 5/2016 | Tabor et al. | |
| 9,510,941 | B2 | 12/2016 | Bishop et al. | |
| 9,539,089 | B2 | 1/2017 | Beith | |
| 10,182,908 | B2 | 1/2019 | Tubishevitz et al. | |
| 10,314,696 | B2 | 6/2019 | Wulfman et al. | |
| 10,426,609 | B2 | 10/2019 | Edelman et al. | |
| 10,631,978 | B2 | 4/2020 | Park et al. | |
| 10,966,826 | B2 * | 4/2021 | Hofferberth | A61F 2/2418 |
| 11,224,509 | B2 * | 1/2022 | Dasi | A61L 27/16 |
| 11,589,981 | B2 * | 2/2023 | Girard | A61F 2/2418 |
| 11,622,853 | B1 * | 4/2023 | Quill | A61F 2/2418 |
| | | | | 623/2.12 |
| 12,076,236 | B2 * | 9/2024 | Dasi | A61F 2/2433 |
| 12,295,835 | B2 * | 5/2025 | Bruchman | A61F 2/2418 |
| 2002/0173842 | A1 * | 11/2002 | Buchanan | A61F 2/2409 |
| | | | | 623/2.14 |
| 2006/0020327 | A1 * | 1/2006 | Lashinski | A61F 2/2415 |
| | | | | 623/2.11 |
| 2006/0047338 | A1 | 3/2006 | Jenson | |
| 2007/0027528 | A1 * | 2/2007 | Agnew | A61F 2/2475 |
| | | | | 623/2.18 |
| 2007/0118210 | A1 * | 5/2007 | Pinchuk | A61L 27/34 |
| | | | | 623/1.26 |
| 2008/0319526 | A1 * | 12/2008 | Hill | A61F 2/2439 |
| | | | | 623/1.12 |
| 2009/0112309 | A1 * | 4/2009 | Jaramillo | A61F 2/2415 |
| | | | | 623/1.26 |
| 2010/0036484 | A1 * | 2/2010 | Hariton | A61F 2/2412 |
| | | | | 623/2.18 |
| 2011/0208290 | A1 | 8/2011 | Straubinger et al. | |
| 2011/0295363 | A1 | 12/2011 | Girard et al. | |
| 2012/0059454 | A1 * | 3/2012 | Millwee | A61F 2/2418 |
| | | | | 623/1.24 |
| 2012/0123529 | A1 * | 5/2012 | Levi | A61F 2/2412 |
| | | | | 623/2.11 |
| 2012/0271398 | A1 * | 10/2012 | Essinger | A61F 2/2412 |
| | | | | 623/1.11 |
| 2013/0131793 | A1 * | 5/2013 | Quadri | A61F 2/2409 |
| | | | | 623/2.38 |
| 2013/0144382 | A1 | 6/2013 | Destefano et al. | |
| 2013/0325117 | A1 | 12/2013 | Bruchman et al. | |
| 2014/0172086 | A1 * | 6/2014 | Quadri | A61F 2/243 |
| | | | | 623/2.38 |
| 2014/0277427 | A1 * | 9/2014 | Ratz | A61F 2/2409 |
| | | | | 623/2.38 |
| 2015/0196688 | A1 * | 7/2015 | James | A61L 27/48 |
| | | | | 623/2.12 |
| 2016/0296325 | A1 | 10/2016 | Edelman et al. | |
| 2016/0317305 | A1 | 11/2016 | Pelled et al. | |
| 2017/0014229 | A1 * | 1/2017 | Nguyen-Thien-Nhon | A61F 2/2418 |
| 2019/0046314 | A1 * | 2/2019 | Levi | A61F 2/0077 |
| 2019/0374337 | A1 * | 12/2019 | Zamani | A61F 2/2412 |
| 2019/0374338 | A1 * | 12/2019 | Grundeman | A61F 2/2418 |
| 2020/0000582 | A1 | 1/2020 | Bishop et al. | |
| 2020/0107928 | A1 * | 4/2020 | Gründeman | A61F 2/2415 |
| 2020/0155308 | A1 * | 5/2020 | Wallace | A61F 2/2409 |
| 2020/0360135 | A1 * | 11/2020 | Hofferberth | A61F 2/2433 |
| 2020/0368017 | A1 * | 11/2020 | Hofferberth | A61F 2/2418 |
| 2020/0368018 | A1 * | 11/2020 | Benichou | A61F 2/2412 |
| 2021/0145572 | A1 * | 5/2021 | Dasi | A61F 2/2418 |
| 2021/0315690 | A1 * | 10/2021 | Morin | A61F 2/2412 |
| 2022/0133474 | A1 * | 5/2022 | Bui | A61F 2/2433 |
| | | | | 623/2.17 |
| 2023/0390054 | A1 * | 12/2023 | Quadri | A61F 2/2418 |
| 2024/0238081 | A1 * | 7/2024 | Bruchman | A61F 2/2415 |

FOREIGN PATENT DOCUMENTS

| | | |
|---|---|---|
| JP | 2016538949 A | 12/2016 |
| WO | 2003024366 A1 | 3/2003 |
| WO | 2019/006383 A2 | 1/2019 |

OTHER PUBLICATIONS

Office Action issued in Japanese Patent Application No. 2019-572742, mailing date Sep. 30, 2022. .
Decision of Rejection issued in Japanese Patent Application No. 2023-032601, mailing date Oct. 15, 2024.
Office Action issued in Canadian Patent Application No. 3,068,176, dated Nov. 27, 2024.
Stanová, V., et al., 2020, "Effects of hemodynamic conditions and valve sizing on leaflet bending stress in self-expanding transcatheter aortic valve: An in vitro study", Artificial Organs 44, E277-E287.
Travaglino, S., et al., 2019, "Computational Optimization Study of Transcatheter Aortic Valve Leaflet Design Using Porcine and Bovine Leaflets", Journal of Biomechanical Engineering 142, 8.
Wheatley, D.J., et al., 1987, "Primary tissue failure in pericardial heart valves", J Thorac Cardiovasc Surg 94, 367-374.
Zhu, M.Z.L., et al., 2017, "Acute Structural Failure of the Trifecta Aortic Valve Bioprosthesis", Heart, Lung and Circulation 26, e82-e85.
Office Action issued in Japanese Patent Application No. 2023-032601, mailing date Apr. 23, 2024.
Rotman, O. et al., "Principles of TAVR Valve Design, Modelling, and Testing", Expert Rev. Med. Devices, 15(11):771-791, 2018.
Simon-Walker, R., et al., "Hemocompatibility of hyaluronan enhanced linear low density polyethylene for blood contacting applications", J. Biomed. Mater. Res. Part B Appl. Biomater./106(5):1964-1975, 2018.
Heitkemper, M., et al., 2019, "In Vitro Hemodynamic Assessment of a Novel Polymeric Transcatheter Aortic Valve", Journal of the Mechanical Behavior of Biomedical Materials 98, 163-171.
Bui, H., et al., ACC Scientific Session, Atlanta, GA, 2021.
Thubrikar, M.J., The Aortic Valve, CRC-Press. 1990.
Ben-Shoshan, J. et al., "Comparison of the Edwards Sapien S3 Versus Medtronic Evolut-R Devices for Transcatheter Aortic Valve Implantation", Am. J. Cardiol. 119(2): 302-307. 2017.
Enríquez-Rodríguez, E. et al., "Comparison of the Hemodynamic Performance of the Balloon-expandable SAPIEN 3 Versus Self-expandable Evolut R Transcatheter Valve: A Case-matched Study", Rev. Esp. Cardiol. 71:735-742. 2018.
Bui, H., et al., SB3C Virtual Conference, 2021.
Smuts, A.N., et al., 2011, "Application of finite element analysis to the design of tissue leaflets for a percutaneous aortic valve", Journal of the Mechanical Behavior of Biomedical Materials 4, 85-98.
Rostagno, C., "Heart valve disease in elderly", World J Cardiol. 2019;11:71-83.

(56) References Cited

OTHER PUBLICATIONS

Fathallah, M., et al., "Pulmonic Valve Disease: Review of Pathology and Current Treatment Options", Current Cardiology Reports. 2017;19:108.
Burke, AP, et al., "Pathology of Rheumatic Heart Disease", Drugs & Diseases. 2015;2019.
Schneider, U., et al., "Two decades of experience with root remodeling and valve repair for bicuspid aortic valves", The Journal of Thoracic and Cardiovascular Surgery. 2017;153:S65-S71.
Borger, MA, et al., "The American Association for Thoracic Surgery consensus guidelines on bicuspid aortic valve-related aortopathy: Full online-only version", The Journal of Thoracic and Cardiovascular Surgery. 2018;156:e41-e74.
Kheradvar, A., et al., "Emerging trends in heart valve engineering: part I. Solutions for future", Annals of biomedical engineering. 2015;43:833-843.
Kumar, V., et al., "Analysis of the Changing Economics of US Hospital Transcatheter Aortic Valve Replacement Programs", Mayo Clinic Proceedings. 2021;96:174-182.
Schoen, FJ, et al., "Causes of failure and pathologic findings in surgically removed Ionescu-Shiley standard bovine pericardial heart valve bioprostheses: emphasis on progressive structural deterioration", Circulation. 1987;76:618-627.
Xuan, Y, et al., "Stent and leaflet stresses across generations of balloon-expandable transcatheter aortic valves", Interactive CardioVascular and Thoracic Surgery. 2020:ivaa037.
Zegdi, R., et al., "Evidence of leaflet injury during percutaneous aortic valve deployment", European Journal of Cardio-Thoracic Surgery. 2011;40:257-259.
Okutucu, S., et al., "A systematic review on durability and structural valve deterioration in TAVR and surgical AVR", Acta cardiologica. 2020:1-11.
Bezuidenhout. D., et al., "Polymeric heart valves for surgical implantation, catheter-based technologies and heart assist devices", Biomaterials. 2015;36:6-25.
Taghizadeh, B., et al., "Biomaterials in Valvular Heart Diseases", Front Bioeng Biotechnol. 2020;8:529244-529244.
Grant CW et al., "On Stress Reduction in Bioprosthetic Heart Valve Leaflets by the Use of a Flexible Stent", Journal of Cardiac Surgery. 1991;6:476-481.
Singh-Gryzbon, S., et al., 2020, "Influence of Patient-Specific Characteristics on Transcatheter Heart Valve Neo-Sinus Flow: An In Silico Study", Annals of Biomedical Engineering 48, 2400-2411.
Sines, G., et al., 1981, "Fatigue Criteria Under Combined Stresses or Strains", Journal of Engineering Materials and Technology 103, 82-90.
Abbasi, M., et al., 2020, "A geometry optimization framework for transcatheter heart valve leaflet design", Journal of the Mechanical Behavior of Biomedical Materials 102, 103491.
Bortolotti, U., et al., 1991. "Failure of Hancock pericardial xenografts: Is prophylactic bioprosthetic replacement justified?" The Annals of Thoracic Surgery 51, 430-437.
Bui, H., et al., 2021a. "Durability Optimization of Novel Hyaluronic Acid Enhanced Polymeric Transcatheter Aortic Valves", American College of Cardiology. Journal of the American College of Cardiology, Atlanta, Georgia, pp. 3236-3236.
Bui, H.T., et al., 2021b, "Transcatheter Heart Valves: A Biomaterials Perspective", Advanced Healthcare Materials 10, 2100115.
Bui, H.T., et al., 2019, "Development and Fabrication of Vapor Cross-Linked Hyaluronan—Polyethylene Interpenetrating Polymer Network as a Biomaterial", ACS Applied Materials & Interfaces 11, 18930-18941.

Butany, J., et al., 2011, "Modes of Failure in Explanted Mitroflow Pericardial Valves", The Annals of Thoracic Surgery 92, 1621-1627.
Duraiswamy, N., et al., 2016, "A Parametric Computational Study of the Impact of Non-circular Configurations on Bioprosthetic Heart Valve Leaflet Deformations and Stresses: Possible Implications for Transcatheter Heart Valves", Cardiovascular Engineering and Technology 7, 126-138.
Gulbulak, U., et al., 2020, "The effect of fundamental curves on geometric orifice and coaptation areas of polymeric heart valves", Journal of the Mechanical Behavior of Biomedical Materials 112, 104039.
Hamid, M.S., et al., 1986, "Influence of stent height upon stresses on the cusps of closed bioprosthetic valves", Journal of Biomechanics 19, 759-769.
Hatoum, H., et al., 2018, "An in vitro evaluation of turbulence after transcatheter aortic valve implantation", The Journal of Thoracic and Cardiovascular Surgery 156, 1837-1848.
Hilbert, S.L., et al., 1992, "Ionescu-Shiley bovine pericardial bioprostheses", Histologic and ultrastructural studies. The American journal of pathology 140, 1195-1204.
Li, K., et al., 2017, "Simulated transcatheter aortic valve deformation: A parametric study on the impact of leaflet geometry on valve peak stress", International Journal for Numerical Methods in Biomedical Engineering 33, e02814.
Li, R.L., et al., 2019, "Mechanical considerations for polymeric heart valve development: Biomechanics, materials, design and manufacturing", Biomaterials 225, 119493.
Martin, C., et al., 2011, "Bio-prosthetic Heart Valve Stress Analysis: Impacts of Leaflet Properties and Stent Tip Deflection", (Ed.), Mechanics of Biological Systems and Materials, vol. 2. Springer New York, New York, NY, pp. 73-78.
Martin, C., et al., 2014, "Simulation of long-term fatigue damage in bioprosthetic heart valves: effects of leaflet and stent elastic properties", Biomechanics and Modeling in Mechanobiology 13, 759-770.
Martin, C., et al., 2017, "Transcatheter Valve Underexpansion Limits Leaflet Durability: Implications for Valve-in-Valve Procedures", Annals of Biomedical Engineering 45, 394-404.
Mirnajafi, A., et al., 2006, "The flexural rigidity of the aortic valve leaflet in the commissural region", Journal of Biomechanics 39, 2966-2973.
Oveissi, F., et al., 2020 "Materials and manufacturing perspectives in engineering heart valves: a review", Materials Today Bio 5, 100038.
Popma, J.J., et al., 2019. Transcatheter Aortic-Valve Replacement with a Self-Expanding Valve in Low-Risk Patients. The New England Journal of Medicine 380, 1706-1715.
Prawel, D.A., et al., 2014, "Hemocompatibility and hemodynamics of novel hyaluronan—polyethylene materials for flexible heart valve leaflets", Cardiovascular engineering and technology 5, 70-81.
Rotman, O.M., et al., 2020, "In Vitro Durability and Stability Testing of a Novel Polymeric Transcatheter Aortic Valve", ASAIO Journal 66, 190-198.
Sarraf, M., et al., 2019, "Transcatheter heart valves", Principles of Heart Valve Engineering, Elsevier, pp. 85-122.
First Examination Report issued in Indian patent application No. 202047003601, dated Mar. 2, 2022.
Office Action issued in Japanese patent application No. 2019-572742, issued Mar. 18, 2022.
Office Action issued in Japanese Patent Application No. 2023-032601, issued Oct. 27, 2023.
Office Action issued in U.S. Appl. No. 17/544,194, issued Nov. 24, 2023.

* cited by examiner

METHODS TO IMPROVE THE DURABILITY OF POLYMERIC HEART VALVES

CROSS REFERENCE OF RELATED APPLICATION

This application is a continuation-in-part application of U.S. patent application Ser. No. 17/544,194, filed Dec. 7, 2021, which is a continuation application of U.S. patent application Ser. No. 16/625,456, filed Dec. 20, 2019, which is a National Stage Entry of PCT/US2018/040421, filed Jun. 29, 2018, which claims the benefit of U.S. Provisional Patent Application No. 62/527,640, filed Jun. 30, 2017, and U.S. Provisional Patent Application No. 62/565,709, filed Sep. 29, 2017. Each of these applications is incorporated herein by reference in entirety.

GOVERNMENT SPONSORSHIP

The present disclosure was made with government support under project number 1R01HL119824-01 by National Institutes of Health, National Heart, Lung and Blood Institute. The government has certain rights in the present disclosure.

FIELD

The present disclosure relates to systems and methods to improve the durability of polymeric heart valves.

BACKGROUND

The heart valve replacement rate is expected to grow in the coming decade. The advent of transcatheter aortic valve replacement (TAVR) provides a safe and minimally invasive medical procedure in high-risk patients. Nevertheless, long-term (>20 years) durability data on transcatheter aortic valves (TAVs) is lacking as TAVR has been in existence less than 20 years. It would be useful to produce a prosthetic heart valve (PHV) that would be durable and may avoid common failure complications involving surgical and transcatheter bioprosthetic valves such as calcification and valvular degeneration of the pericardial leaflets.

SUMMARY

A transcatheter prosthetic heart valve includes a stent frame and a leaflet material. The stent frame includes a top portion and a bottom portion. The leaflet material includes a lower portion attached to the stent frame and an upper portion that includes leaflets capable of moving between an open configuration and a closed configuration. At least a portion of the leaflet material weaves through the stent frame. The transcatheter prosthetic heart valve also includes one or more reinforcement components coupled to the stent frame and/or to the leaflet material to enhance performance of the transcatheter heart valve.

A method of forming a transcatheter prosthetic heart valve includes creating a computer-aided design (CAD) model of shaped leaflets of the transcatheter prosthetic heart valve based on one or more optimization studies. The method includes forming a mold of the shaped leaflets and thermoforming a leaflet material into the shaped leaflets using the mold. The method includes trimming away access leaflet material and mounting the thermoformed leaflets onto a stent frame. The method includes weaving at least a portion of the shaped leaflets through the stent frame. The method also includes coupling one or more reinforcement components to the stent frame and/or to the shaped leaflets to enhance performance of the transcatheter heart valve.

DETAILED DESCRIPTION

The present disclosure is directed to a prosthetic heart valve (PHV). In particular, a PHV having a tri-leaflet design for use in a percutaneous (or transcatheter) valve replacement procedure (hereinafter "TPHV"). Flexible polymers can be a sustainable leaflet material for a TAV. The present disclosure describes methods and features that can improve the durability and performance of polymeric TAV. For example, the durability and performance are improved through (1) leaflet design optimization, (2) stent design optimization, (3) leaflet design optimization under stress-free state, (4) leaflet fabrication & valve assembly, (5) shock absorber or dampener fabrication, (6) curtain design, and/or (7) fiber reinforcement. The methods or approaches disclosed herein for improving the durability and performance of a PHV may be used in combination with or implemented on prosthetic heart valves disclosed in U.S. patent application Ser. No. 17/544,194.

Leaflet Design Optimization for Closed Valve Configuration

Figure 1:
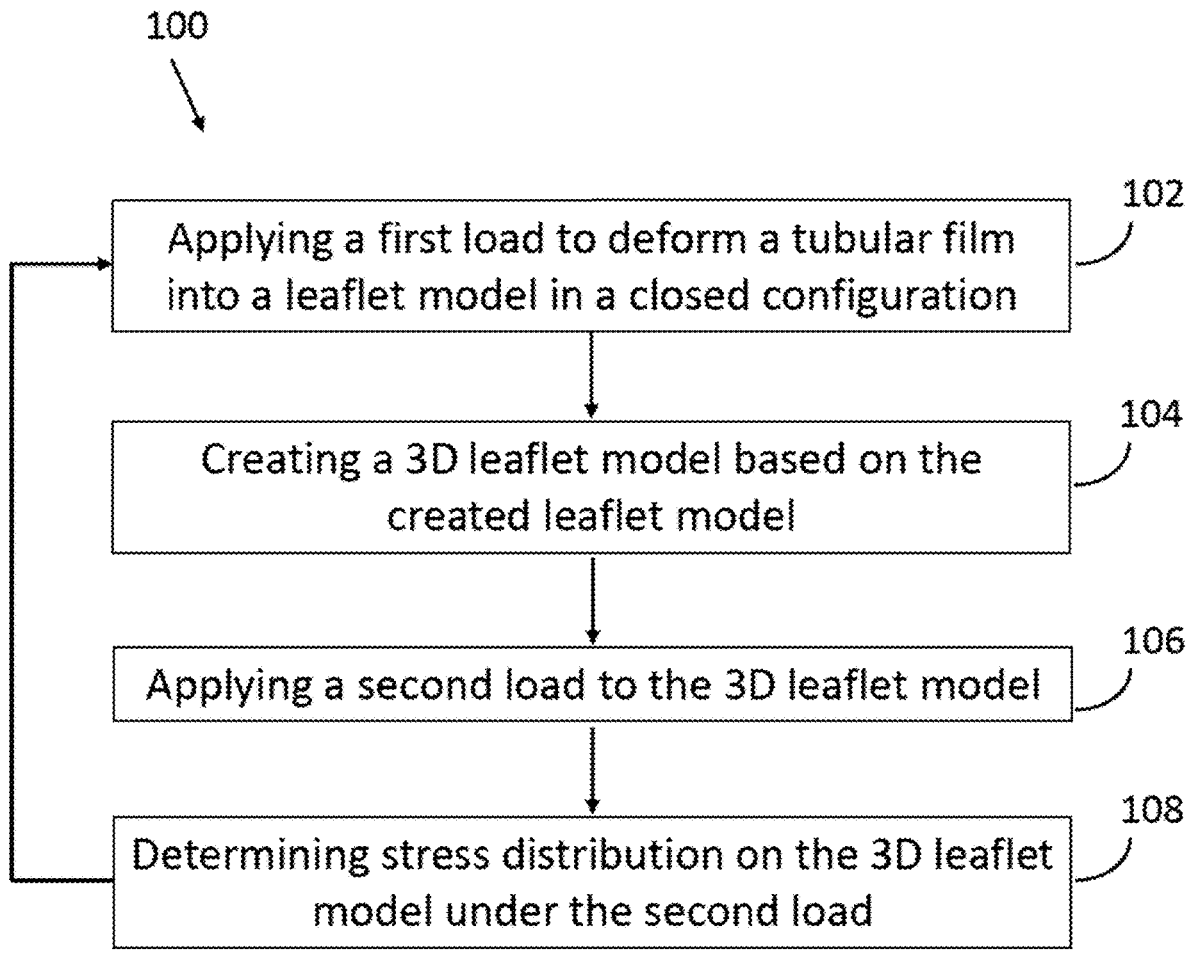
FIG. 1 shows an example optimization process using finite element modeling (FEM) to optimize shaped leaflets of a prosthetic heart valve (PHV)

Finite element modeling (FEM) is used to simulate a shape of a PHV's cusps where the stress concentration can be greatly reduced during closing. FIG. 1 shows an example optimization process 100 to optimize the shape of the PHV leaflets using FEM. The optimization process 100 disclosed herein may be run using any suitable FEM packages, e.g., ANSYS, COMSOL Multiphysics, ABAQUS, MATLAB, AutoDesk CFD, Altair HyperWorks, etc., stored in and executed by a processor or computer.

The optimization process 100 includes applying a first load to deform a tubular film into a leaflet model in a closed configuration (step 102). The load conditions for the first load in step 102 depend on the stent frame's height and geometry since the leaflet would be fixed along edges of the stent frame. The stent frame's height and geometry and the corresponding leaflet are predetermined based on parametric studies. The first load is applied on the downstream side of a corresponding predetermined leaflet model to obtain the desired curvatures and shape of the leaflets. In the FEM simulation, fixed edge boundary conditions are applied on the outer side of the cusps.

The optimization process 100 includes creating a three-dimensional (3D) leaflet model based on the created leaflet model (step 104). The geometry of the leaflet model created in step 102 is loaded in a computer-aided design (CAD) program to re-create a 3D leaflet model.

The optimization process 100 includes applying a second load to the 3D leaflet model (step 106) and determining stress distribution on the 3D leaflet model under the second load (step 108). FEM simulation is performed on the 3D leaflet model to determine the stress distribution under the second load. The second load simulates the load conditions experienced by the leaflets during valve closing.

At least some steps of the optimization process 100 may be repeated multiples times to refine the 3D shaped leaflet geometry to significantly minimize or reduce the stress within the leaflet during valve closing. For example, steps 102, 104, 106, and 108 may be repeated multiple times under different load conditions until a desired leaflet geometry is achieved. The iterative process helps determining a 3D shaped leaflet with minimal deformation during valve closing to reduce the leaflet stress concentration.

Figure 2:
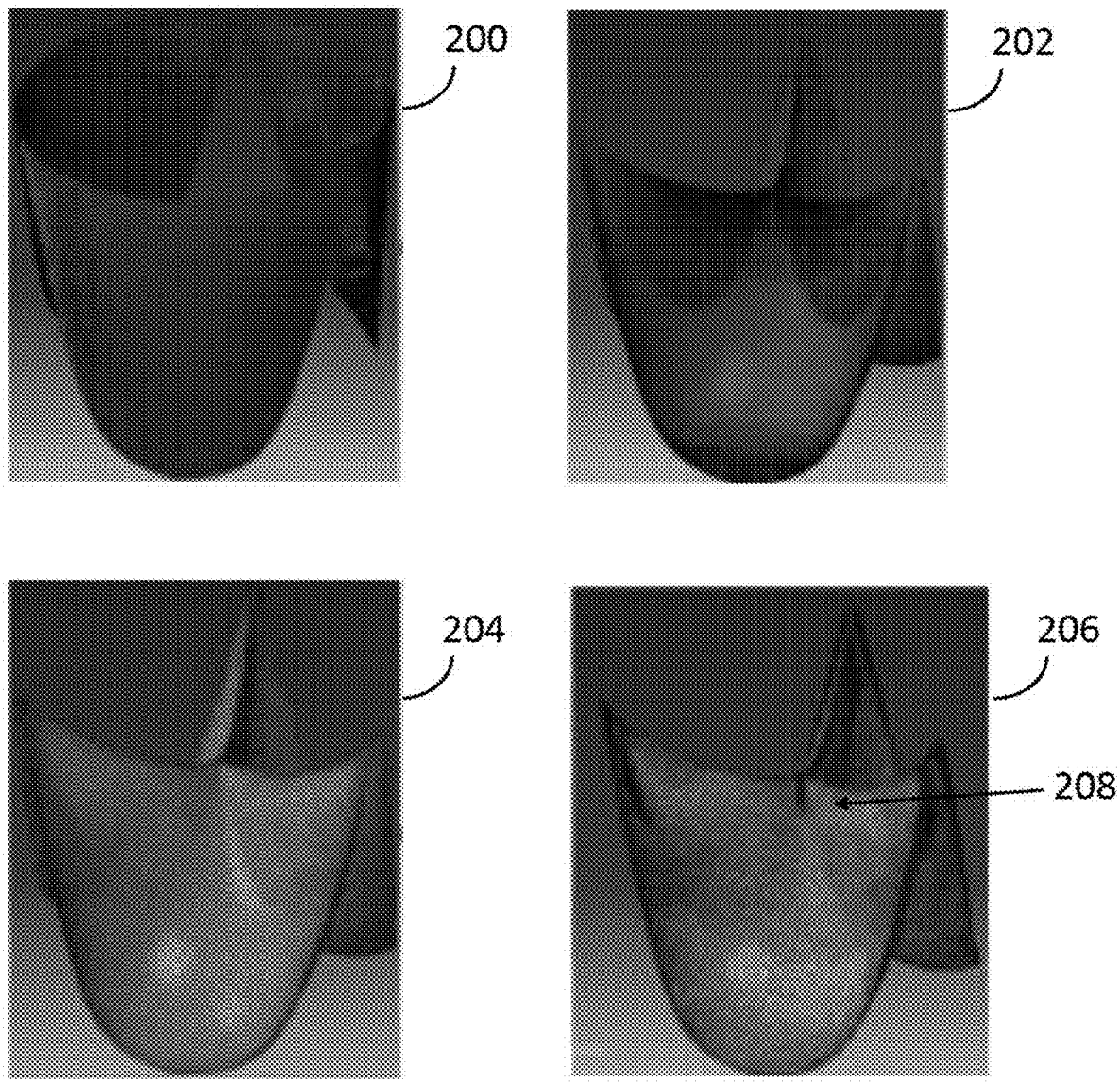
FIG. 2 shows example FEM simulation frames of various steps in the PHV optimization process shown in FIG. 1.

FIG. 2 shows example FEM simulation frames of various steps in the PHV optimization process shown in FIG. 1. A simulation frame 200 shows an example initial state of a leaflet material. The cusps have a cylindrical shape like a tubular film. The leaflet material is simulated with properties suitable for synthetic polymers for a PHV. For example, the PHV's leaflets may be made of any thermoplastic polymers, such as polycarbonate, polyethers, polysulfone, polyamide, polystyrene, polyesters, polyetheretherketone, thermoplastic polyurethanes, or combinations thereof. The leaflet material may be made of naturally derived or synthetic polymers. The leaflet material can be made of polyolefin, polycarbonate, polypropylene, polystyrene, acetal, acrylic, acrylonitrile butadiene styrene (ABS), or combinations thereof.

In the illustrated example, the leaflet material, e.g., the tubular film, in step 102 in FIG. 1 is 80 micrometer (μm) thick, has a Poisson ratio of 0.45, and is linearly elastic with a Young's modulus of 20 mega pascal (MPa).

A simulation frame 202 shows an example leaflet model for a PHV in a closed configuration. The leaflet material has a sufficiently low modulus such that the cusps that are compliant enough to be deformed under an applied load, e.g., the first load, to form an optimized/idealized shape. In the illustrated example, the first load in step 102 in FIG. 1 is applied to the simulation frame 200 to deform the leaflet material into a leaflet model in a closed configuration as shown in the simulation frame 202. The first load conditions and/or the mechanical properties of the leaflet material may be updated to minimize the stresses distributed within the leaflets.

A simulation frame 204 shows an example 3D leaflet model under zero load and a simulation frame 206 shows an example 3D leaflet model with stress distribution under the second load. In the illustrated example, the second load in step 106 in FIG. 1 is applied to the simulation frame 204 to simulate the stress experienced by the leaflets during valve closing. As shown in the simulation frame 206, the stress distribution or high stress lines are distributed along the commissures 208 of the leaflets. The optimization process 100 is refined through one or more iterations to optimize the shape of the leaflet in order to reduce or significantly minimize the stress distribution within the leaflet during valve closing.

Stent Design Optimization

The fixed edge of the heart valve leaflet may be influenced by the curvatures of the stent frame. The fixed edge of the leaflet may be held intact with the support of the stent frame, and the stent-leaflet interface forms the fixed edge of the leaflets. Structural damage of a PHV often occurs along this edge.

Figure 3:
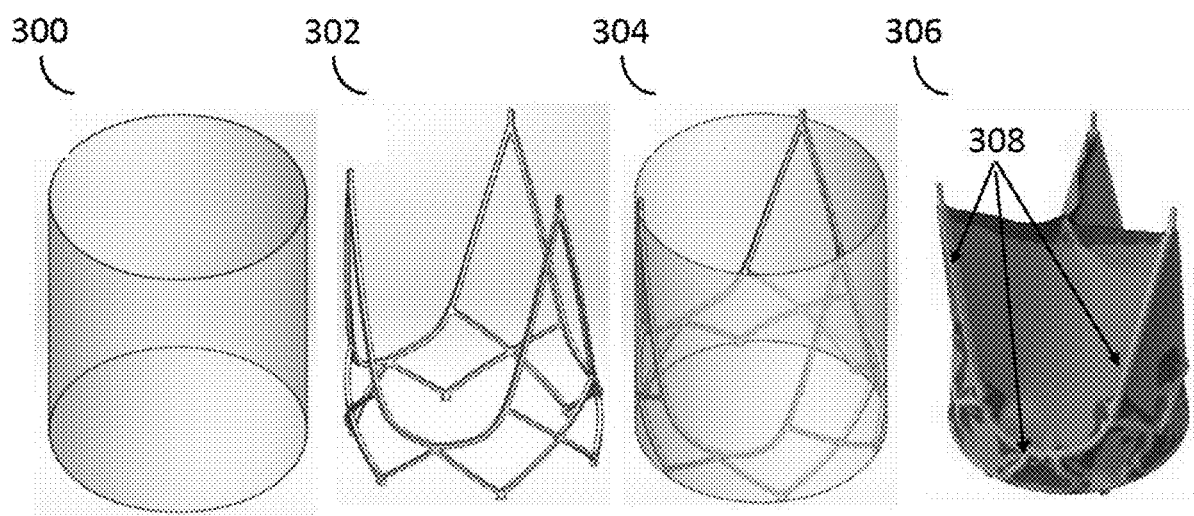
FIG. 3 shows an example PHV assembling process and the FEM simulated stress distribution in the assembled PHV.

FIG. 3 shows an example PHV assembling process and the FEM simulated stress distribution in the assembled PHV. Frames 300, 302, 304, 306 of FIG. 3 show example polymeric valve assembling steps in a chronological order. A tubular polymeric leaflet shown in frame 300 is wrapped around a stent frame shown in frame 302, creating an assembled form shown in frame 304. The applied transvalvular pressure load (e.g., simulated load using FEM) leads to the closed configuration of the PHV shown in frame 306 (e.g., a stress contour plot). The stress distribution helps predicts and compare the valve durability of different designs. In the illustrated example, the fixed edge of the leaflet is located along edges 308 of the PHV.

The simulation results shown in frame 306 of FIG. 3 demonstrates that the stress concentration is indeed the highest along the leaflet's fixed edge, also known as the stent-leaflet interface. In the present disclosure, the curvature of the leaflet's fixed edge is changed by altering the stent curvature to mitigate structural damage and improve the PHV's fatigue life. The alteration of angles along the stent frame to change its shape is tested via computational modeling, e.g., using any suitable FEM simulation package stored in and executed by a processor or a computer.

Figure 4:
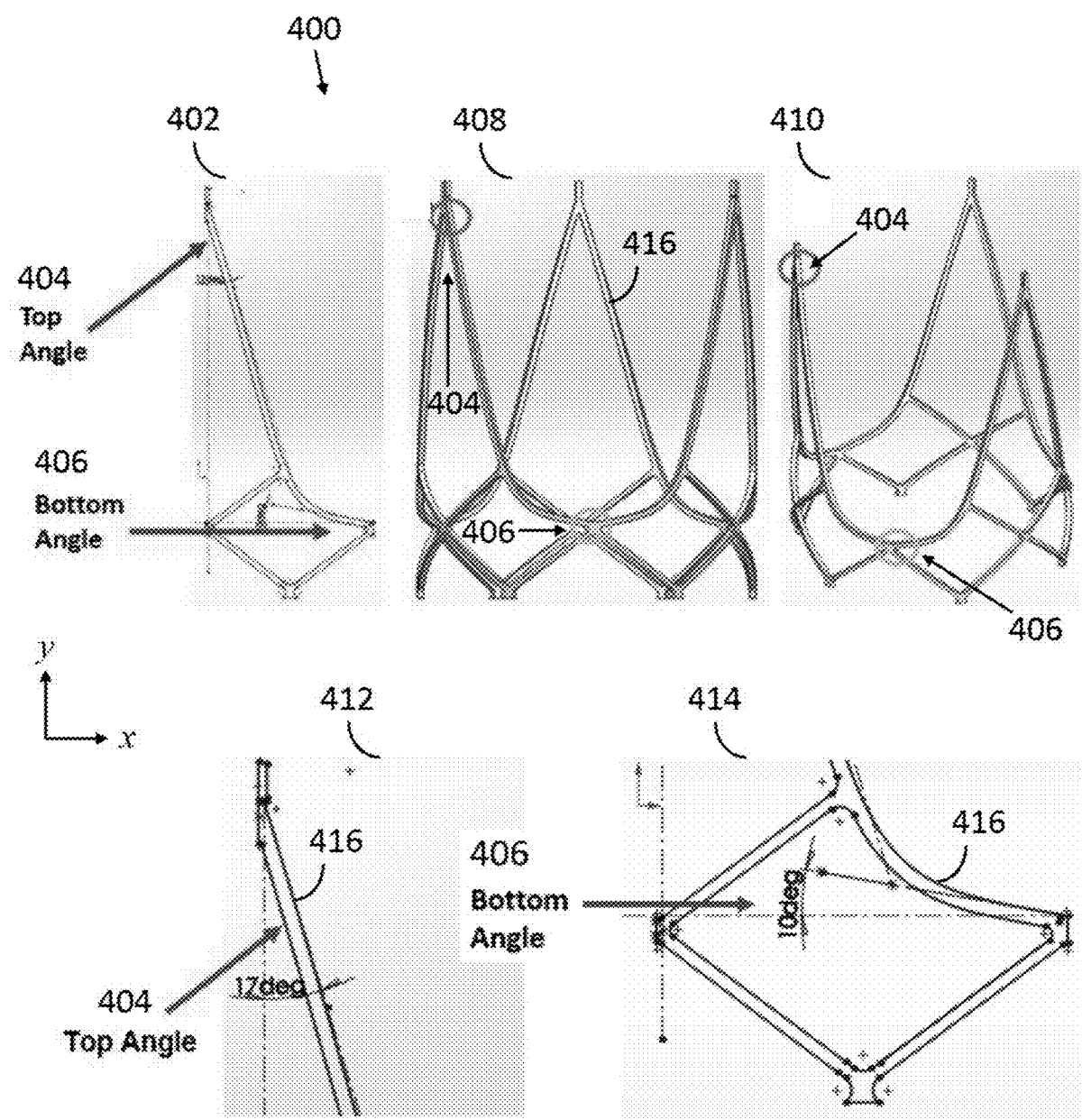
FIG. 4 shows an example PHV wherein the curvature of a portion of the stent frame is designed to enhance the performance of the PHV.

FIG. 4 shows an example PHV having a stent frame 400 wherein the curvature of stent frame 400 may be optimized to enhance the performance of the PHV. Frame 402 of FIG. 4 shows an example two-dimensional (2D) CAD model of ⅙ of the stent frame 400 covering half of a leaflet. A top angle 404 and a bottom angle 406 are varied in the parametric study via computational modeling. The top angle 404 is located at the tip of the stent post and the bottom angle 406 is at the base, corresponding to the nadir of the leaflet. Frames 408 and 410 of FIG. 4 show the front and isometric views of the 3D CAD model, respectively, with the portions of the top angle 404 and the bottom angles 406 labeled in circles.

Frames 412 and 414 show an enlarged view near the top angle 404 and the bottom angle 406. In the illustrated orientation, the vertical direction (e.g., the y-axis) is along the height of the stent frame 400 and the horizontal direction (e.g., the x-axis) is along the diameter of the stent frame 400. The top angle 404 is the angle between the top portion of the stent post 416 and the vertical direction, e.g., the top angle 404 is half of the angle at the tip of the stent post. The bottom angle 406 is the angle between the bottom portion of the stent post 416 and the horizontal direction.

The curvature of the stent frame 400 can vary by changing the angles of the stent at the leaflet post and nadir, e.g., the top and bottom angles 404 and 406. In the parametric study via computational modeling, leaflet deformations during the diastolic phase are obtained by applying the peak aortic transvalvular pressure. In the illustrated example, the leaflet is modeled after linear low-density polyethylene (LLDPE), and the stent frame 400 is modeled after cobalt chrome alloys. A transvalvular pressure of 100 mmHg is applied during the simulation to mimic mid diastole at the aortic valve. The contour plots of the maximum principal stress and strain are captured and the peak values and their locations are recorded for each simulation as summarized in Table 1.

Table 1 shows the simulated peak stress values on the leaflet from the stent parametric study wherein the curvature of the leaflet fixed edge is varied by manipulating the top and bottom angles 404 and 406 described in FIG. 4. The peak stress values in Table 1 are in megapascal (MPa). With the top angle 404 varies from 0°, 6°, 12°, 17° to 20° and the bottom angle varies from 0°, 10°, 20°, 30° to 40°, the variation in peak stress value is over a twofold difference, e.g., the peak stress values vary between 6.07 MPa and 13.8 MPa.

TABLE 1

|  |  | Bottom Angle | | | | |
|---|---|---|---|---|---|---|
|  |  | 0° | 10° | 20° | 30° | 40° |
| Top Angle | 0° | 13.80 | 13.40 | 11.00 | 10.80 | 10.80 |
|  | 6° | 9.50 | 8.90 | 8.18 | 8.62 | 9.30 |
|  | 12° | 6.58 | 6.77 | 6.73 | 6.99 | 7.54 |
|  | 17° | 6.24 | 6.10 | 6.07 | 6.15 | 6.38 |
|  | 20° | 6.56 | 6.47 | 6.32 | 6.31 | 6.24 |

Figure 5:
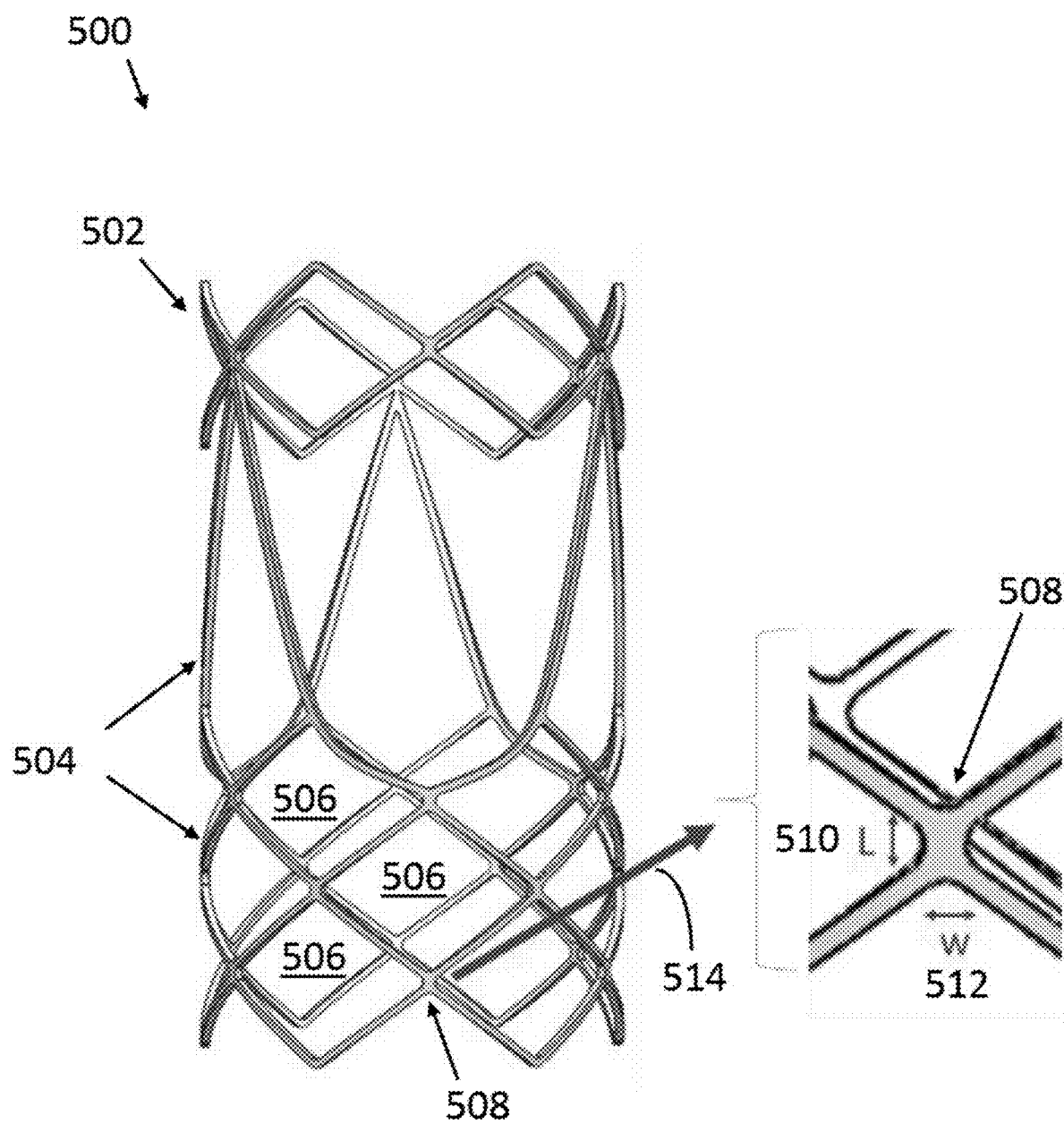
FIG. 5 shows an example of the PHV of FIG. 4 wherein other portions of the stent frame are designed to enhance the performance of the PHV.

Stent design may be further optimized for performance by adjusting the geometry of the stent cells, the strut, the connectors, the crown, or a combination thereof. FIG. 5 shows an example stent frame 500 having a crown 502, structs 504, stent cells 506, and connectors 508. The connectors 508 have a length 510 and a width 512 which can be varied to change the peak stress on the stent frame 500. In FIG. 5, the stent cells 506 are shown with an arrow 514 pointing at a magnified portion presenting the connectors 508.

The important parameters to optimize the connector design are the length 510, the width 512, and the curvature of the connectors 508. The curvature of the connectors 508 is dependent on the length 510 and the width 512, e.g., the relative ratio of the length 510 and the width 512. The length 510 and the width 512 of the connectors 508 can be changed to change the durability and performance of the stent. Table 2 shows the simulated peak stress values at the connectors 508 from the stent parametric study wherein the length 510 and the width 512 (and thus also the curvature) of the connectors 508 are varied. The peak stress values in Table 2 are in megapascal (MPa). With the length 510 of the connectors 508 varies between 1.13 millimeters (mm) and 0.32 mm and the width 512 of the connectors 508 varies between 1.08 mm and 0.29 mm, the variation in peak stress values vary between 795 MPa and 723 MPa.

TABLE 2

| Length (mm) | Width (mm) | Peak Stress (MPa) |
|---|---|---|
| 1.13 | 0.88 | 779 |
| 0.40 | 0.29 | 770 |
| 0.71 | 0.71 | 773 |
| 0.95 | 1.08 | 792 |
| 0.32 | 0.37 | 795 |
| 0.54 | 0.82 | 723 |
| 0.32 | 0.37 | 787 |

Similarly, the dimensions of the crown 502, the struts 504, and the stent cells 506 may be optimized to change the stress distribution, durability, and performance of the stent.

Figure 6:
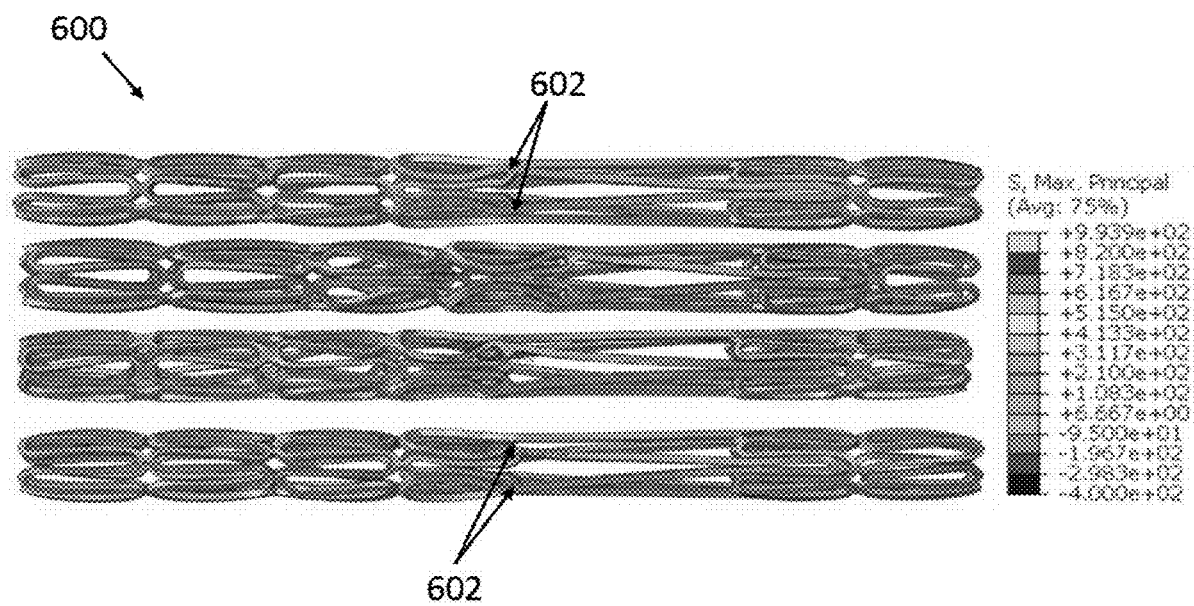
FIG. 6 shows an example FEM simulation result of four crimpled version of the PHV of FIG. 5 with different stent frame designs.

FIG. 6 shows an example FEM simulation result (a stress contour plot with scale values in MPa) of a crimpled version of four stent frames 600 of different designs (e.g., different width and lengths at the connectors), each crimped from 23 millimeters (mm) in outer diameter (OD) down to 5 mm. The peak stresses occur at the connectors 602 in all four of the stent frames 600. In its crimped state, the stent frame of different designs, e.g., different widths and lengths at the connectors, have peak stresses range from 773 MPa to 994 MPa, and the peak stresses always occurs at the connectors 602.

The stent frame may be made of any suitable and biocompatible metal alloys, including but not limited to cobalt, nickel, titanium, steel, or combinations thereof.

Leaflet Design Optimization Under Stress-Free State

The polymeric PHV disclosed in the present disclosure can compose of flexible polymeric leaflets that can be designed to have different shapes, geometry, material properties, physical properties, topography, porosity, thicknesses, or combinations thereof, in its stress-free state. Herein the stress-free state is defined as an environment that lacks external influences, e.g., influences through heat, mechanical load, radiation, biological components, and/or chemical reaction.

Figure 7:
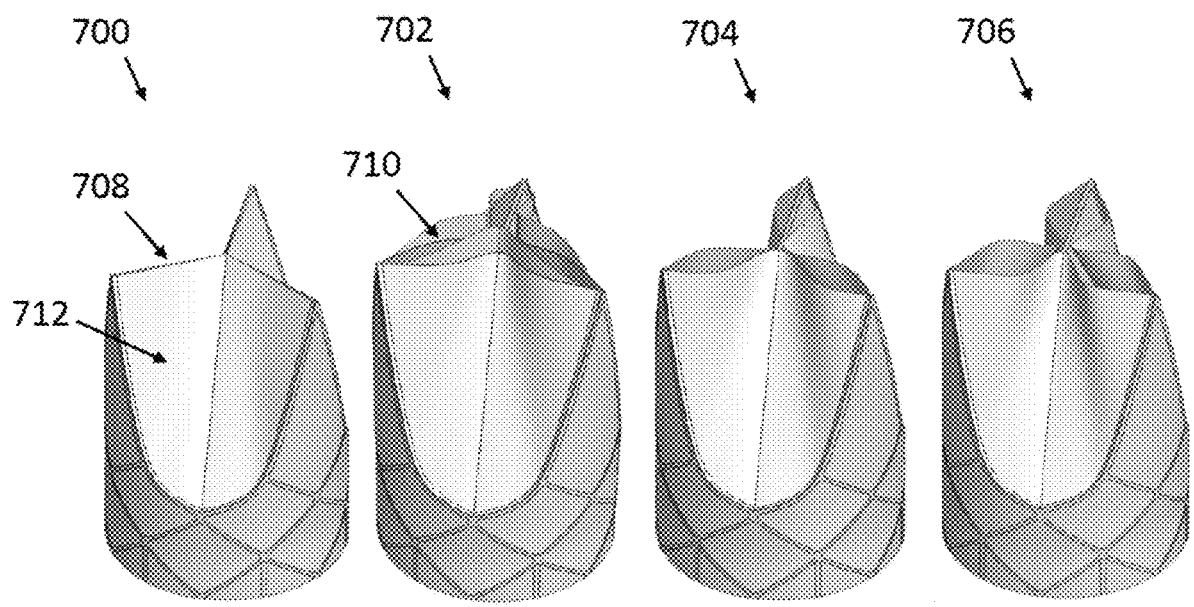
FIG. 7 shows an example of PHV models with different leaflet shapes under stress-free state.

In the stress-free state, the PHV can have a closed configuration where the leaflets fully coapted, creating a tight seal along its free edge, which is defined as the edge where two leaflets touch. The PHV can have an open configuration in its stress-free state where the free edges are predetermined to control the gaps between the two leaflets. FIG. 7 shows examples of PHV models 700, 702, 704, and 706 with different leaflet shapes under its stress-free state. One of the important differences among these PHV models are their opening shapes, which can be determined by the free edge's curvature 708 that directly influences the gap 710 among the leaflets 712.

The PHV models 700, 702, 704, and 706 with different shapes in their stress-free state are tested in an in vitro model mimicking the left heart condition. The leaflets 712 are made of LLDPE and formed into the desirable shapes through thermoforming. The aortic pressure, pulsatile rate, and cardiac output are 120/80 millimeters of mercury (mmHg) (peak systole/diastole), 60 beats per minute (bpm), and 5 liters per minute (L/min), respectively. The ventricular and aortic pressures are recorded via catheter transducers. The pressure gradient (PG) and the regurgitation fraction (RF) are calculated. PG is defined as the average transvalvular pressure when the valve opens, and the RF is the total backflow volume divided by the total forward volume per cardiac cycle.

Figure 8:
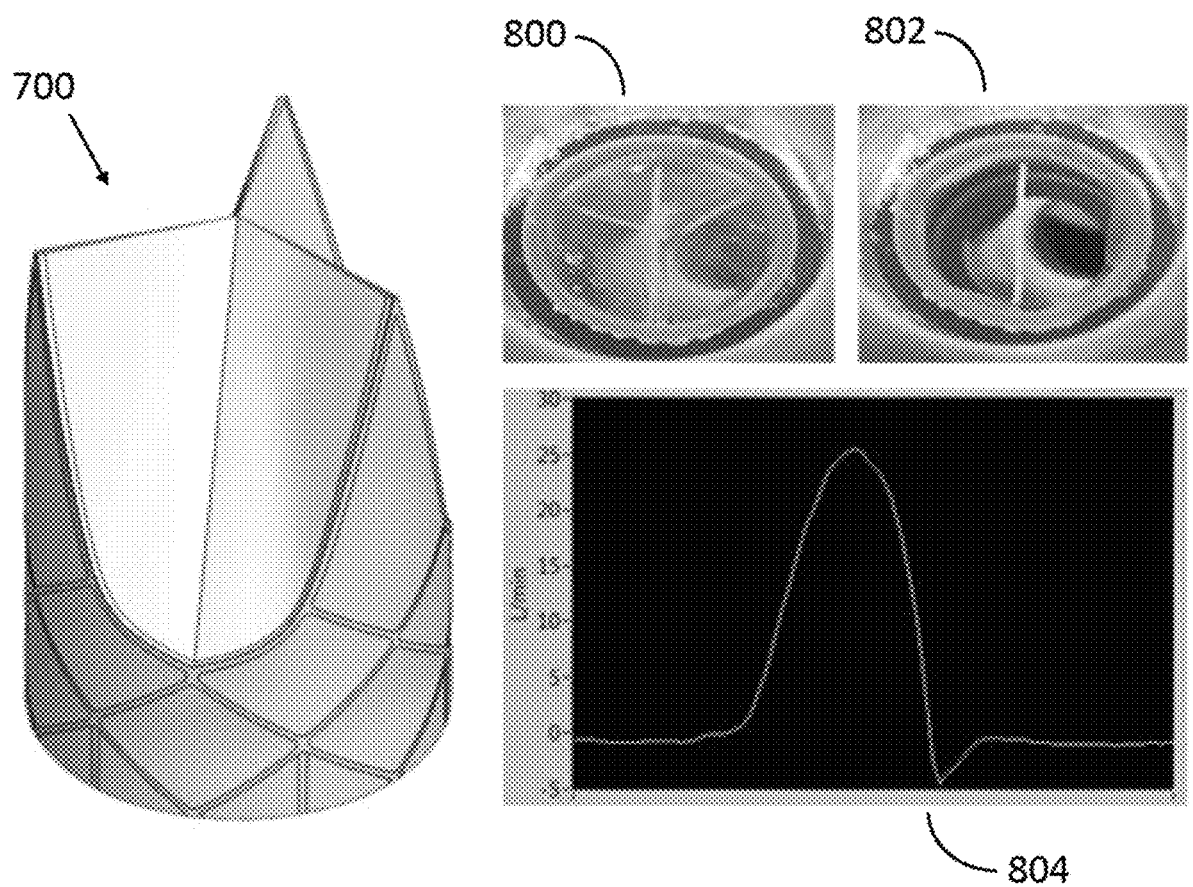
FIG. 8 shows example test results of a PHV model from FIG. 7 with a fully closed configuration in its stress-free state.

FIG. 8 show an example result of the PHV model 700, which is a polymeric PHV with a fully closed configuration in its stress-free state, tested under an in vitro model mimicking the left heart condition. Images 800 and 802 show the PHV when it is fully closed (mid diastole) and fully opened (systole), respectively. A flow profile 804 shows that the PG is 6.2 mmHg and the RF is 8.6%.

Figure 9:
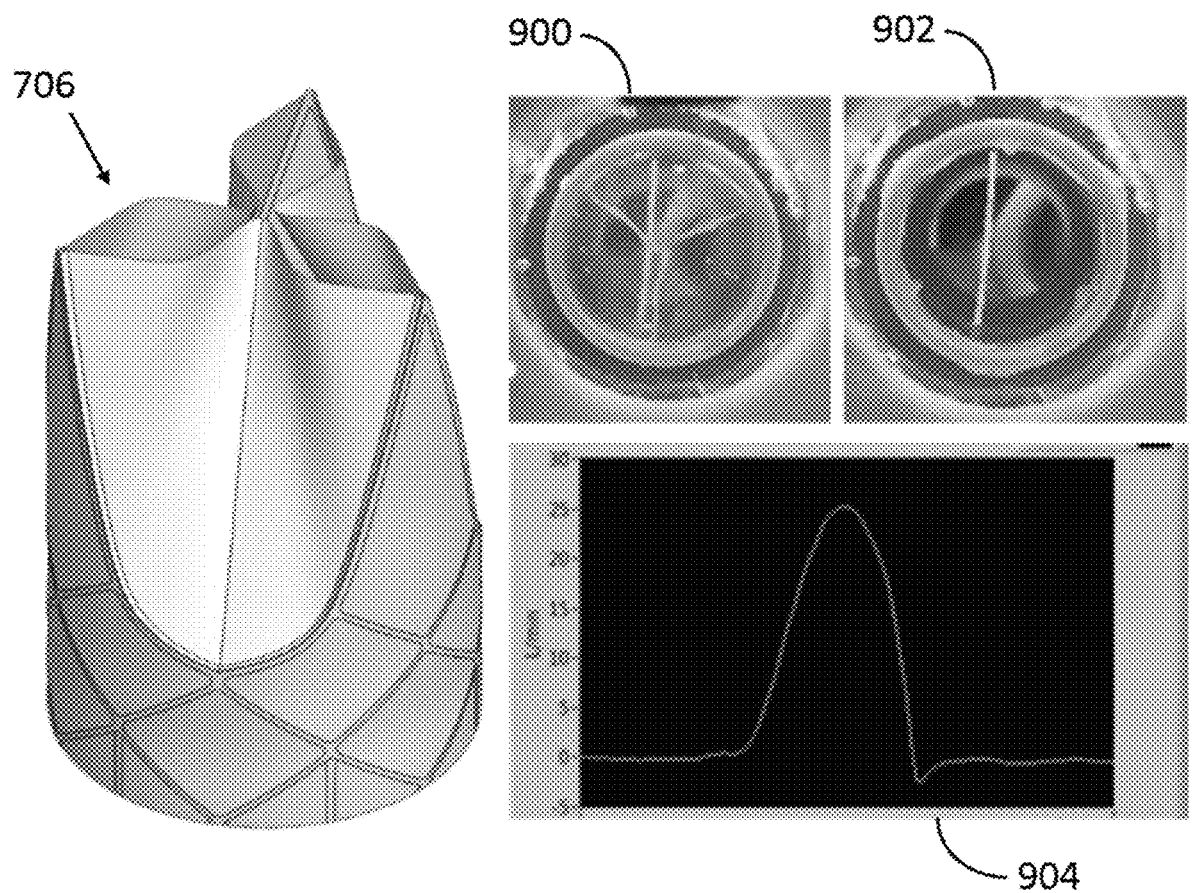
FIG. 9 shows example test results of a PHV model from FIG. 7 with an open configuration in its stress-free state.

FIG. 9 show an example result of the PHV model 706, which is a polymeric PHV in an open configuration in its stress-free state, tested under an in vitro model mimicking the left heart condition. Images 900 and 902 show the PHV when it is fully closed (mid diastole) and fully opened (systole), respectively. A flow profile 904 shows that the PG is 4.4 mmHg and the RF is 4.1%.

Leaflet Fabrication & Valve Assembly

The polymeric PHV disclosed herein can be fabricated to achieve the desired shape and conformation through thermoforming. In the thermoforming process, the polymeric material to be made into the PHV is placed on a platform and heat is applied. The polymeric material reaches its softening temperature due to the heat, and a mechanical load is applied on the softening polymeric material, which allows for shaping of the polymer into the desired PHV shape. A mold can be placed under the film during heat treatment to achieve the desired shape. The mold can be made of any material that does not deform due to the heated polymeric material. The mechanical load applied on the softened polymers can be created by a vacuum, pressure, compression under a weighted object, or a combination thereof.

Figure 10:
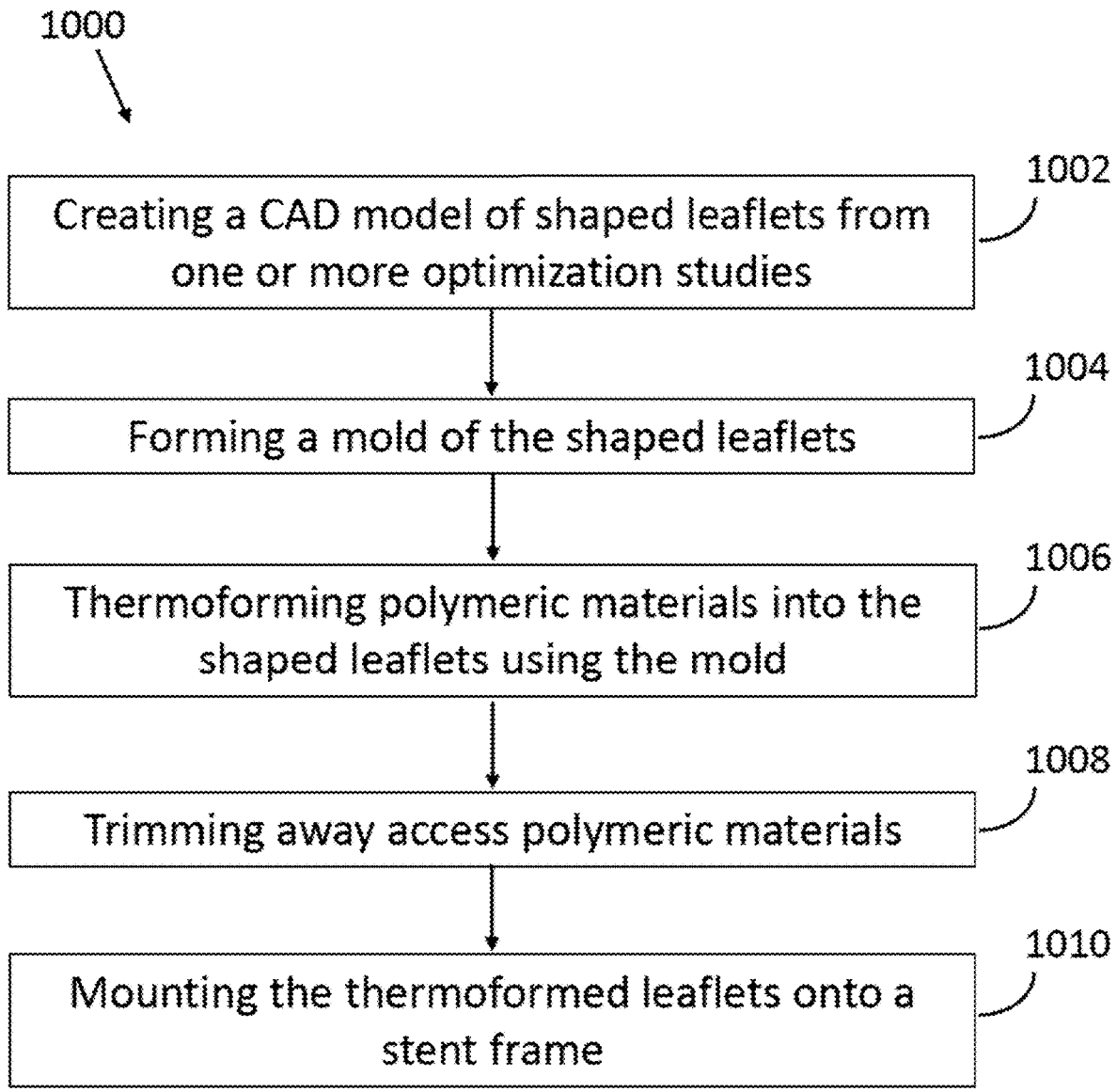
FIG. 10 shows an example process of assembling a PHV with shaped leaflets.

FIG. 10 shows an example process 1000 for assembling a PHV with optimized shaped leaflets. The process 1000 includes creating a CAD model of shaped leaflets from one or more optimization studies (step 1002). The shape of the leaflet is optimized by one or more of the optimization approaches, including the leaflet design optimization, the stent design optimization, and the leaflet design optimization under stress-free state.

The process 1000 includes forming a mold of the shaped leaflets (step 1004). A mold for molding the leaflet geometry from the design optimization study may be made using any suitable processes. The mold can be fabricated through any means including milling, subtractive manufacturing, additive manufacturing, or 3D printing. The mold can be made of any suitable materials that can form a smooth surface and can withstand the heat and pressure from the process to form the leaflets.

The process 1000 includes thermoforming polymeric materials into the shaped leaflets using the mold (step 1006). The mold is mounted on a thermoforming machine, which heats a flat polymeric film at a predetermined temperature for a predetermined duration. The temperature and duration at least depend on the material and/or thickness of the polymeric film. For example, for a LLDPE film, the predetermined temperature may be between 185 degrees Fahrenheit (° F.) and 250° F. and the predetermined duration may be between 10 seconds (s) and 50 s, between 15 s and 40 s, between 18 s and 30 s, 19 s, or 20 s. Once the polymer sheet is soft, a vacuum, pressure, compression under a weighted object, or a combination thereof, is applied and the mold is pressed against the heated polymeric film to obtain the leaflet geometry from the mold. The thermoforming process may include both pressure and vacuuming forming. The thermoforming process may include one or more steps of vacuum forming, pressure forming, molding, compressing, heating, annealing, tempering, cold working, and stretching. The polymeric film described here can be any thermosoftening plastics such as polyethylene, polystyrene, polycarbonate, polyethers, polyesters, thermoplastic polyurethane, and acrylonitrile butadiene styrene (ABS), or any other leaflet materials disclosed in the present disclosure.

The process 1000 includes trimming away access polymeric materials (step 1008). Any excess polymeric material is trimmed away.

The process 1000 includes mounting the thermoformed leaflets onto a stent frame (step 1010). The thermoformed leaflets are mounted onto a frame to form a PHV. Step 1010 may include attaching the thermoformed leaflets to the stent frame in configurations/methods described in U.S. patent application Ser. No. 16/625,456. For example, the thermoformed leaflet disclosed herein may be woven through the stent frame, such that a lower portion of the thermoformed leaflet is disposed about an exterior surface of the stent frame, an upper portion of the thermoformed leaflet is at least partially disposed within an interior surface of the stent frame, at least a portion of an upper portion of the thermoformed leaflet wraps around a connection point of the top portion of the stent frame and folds towards the interior surface of the stent frame, and at least a second portion of the thermoformed leaflet weaves under an upper edge of the top portion of the stent frame and folds towards the interior surface of the stent frame. The thermoformed leaflet may be chemically or physically bonded to the stent frame or components of the PHV.

Figure 11:
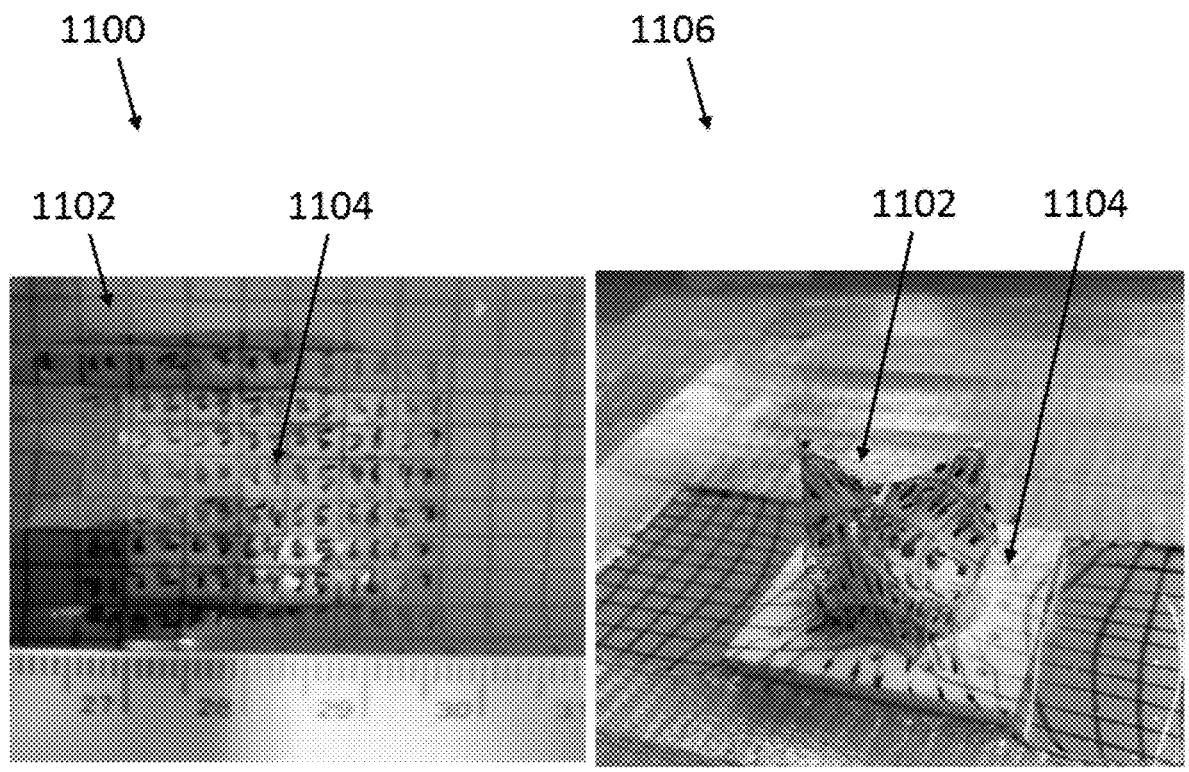
FIG. 11 shows an example formation of shaped leaflets of a PHV.

FIG. 11 shows an example formation of shaped leaflets of a PHV. In view 1100, a film 1102, e.g., a linear low-density polyethylene (LLDPE) film, sits above a mold 1104 that has the optimized shaped geometry. After the film 1102 is heated, the mold 1104 is pushed upward against the softened film 1102 and a vacuum is applied in order for the film 1102 to shape or conform around the mold 1104 shown in view 1106.

Figure 12:
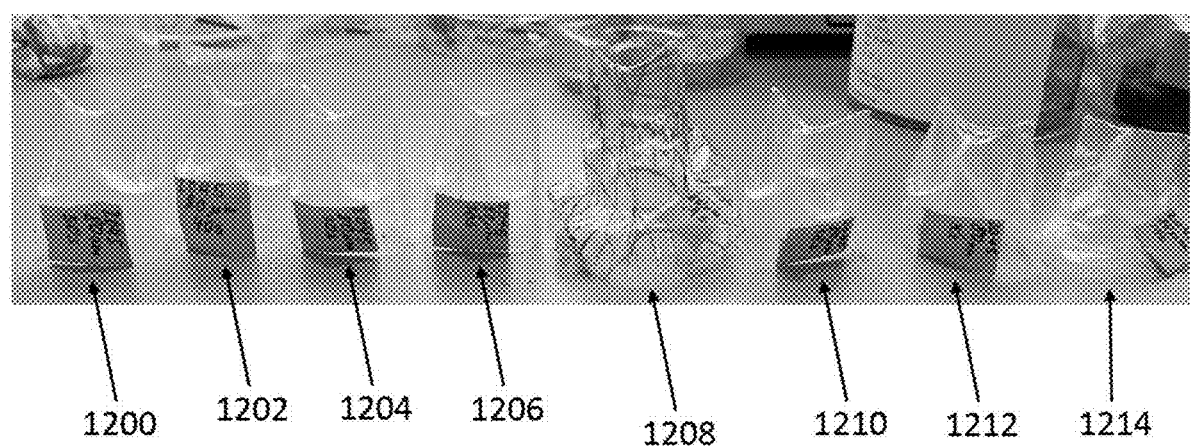
FIG. 12 shows examples of shaped leaflets formed under different heating durations in a thermoforming process.

FIG. 12 show samples of the thermoformed LLDPE films 1200, 1202, 1204, 1206, 1208, 1210, 1212, and 1214 that were heated for 50 s, 40 s, 30 s, 20 s, 19 s, 18 s, 15 s, and 10 s, respectively. Among these examples, the thermoformed LLDPE film 1204 heated for 30 s gives the best performance.

Figure 13:
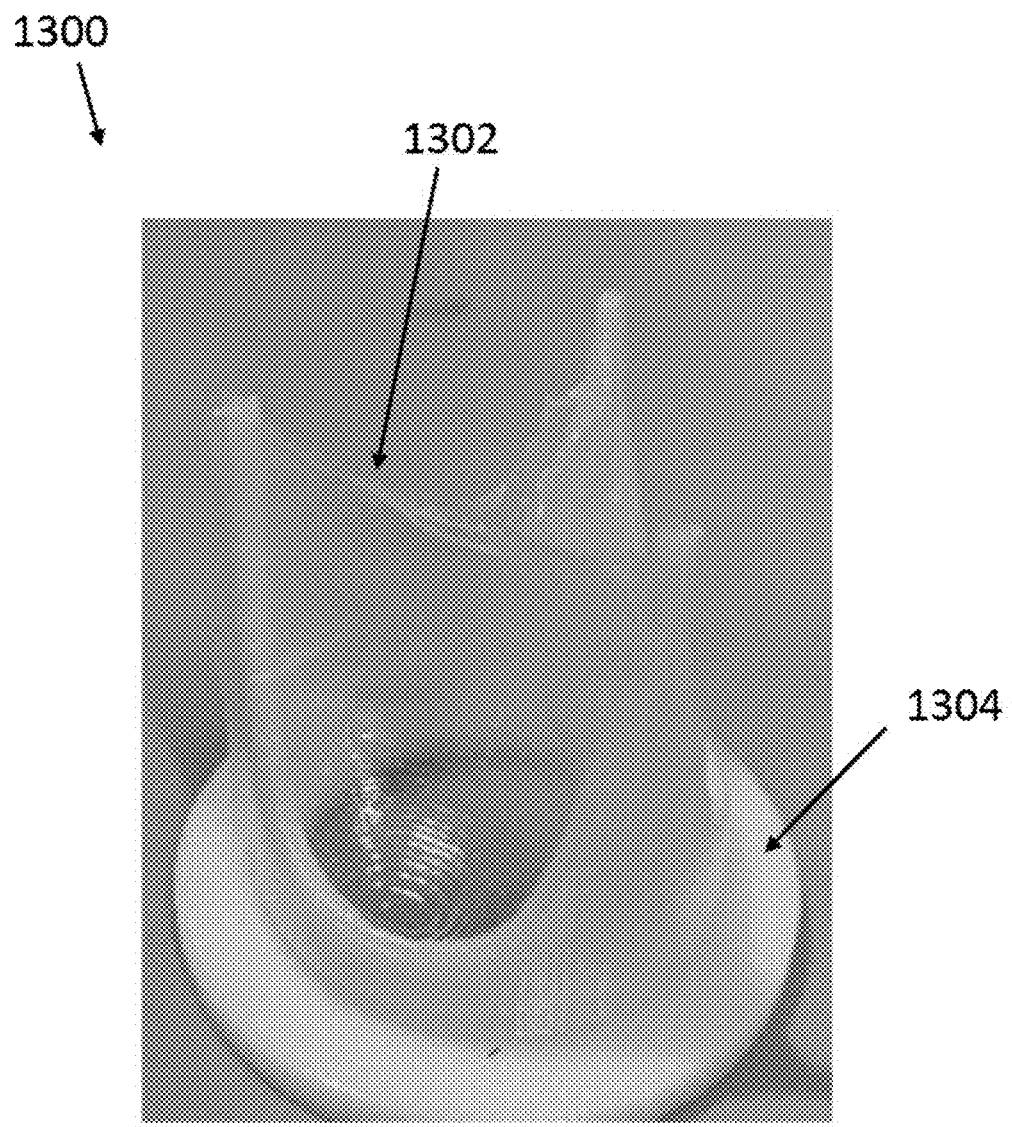
FIG. 13 shows an example of an assembled PHV with thermoformed shaped leaflets.

FIG. 13 shows an example of an assembled PHV 1300 with the thermoformed leaflets. In this illustrated example, the thermoformed leaflets 1302 are clear LLDPE plastic leaflets and the valve frame 1304 is made from 3D printed ABS plastic.

To test the performance, the PHVs with thermoformed leaflets are tested in a left heart simulator under pulsatile aortic flow conditions. A water-glycerin mixture (40:60 v/v) is used as the blood analog. The aortic pressure, pulsatile rate, and cardiac output are 80/120 mmHg, 60 beats per minute (bpm), and 5 liters per minute (L/min), respectively. The ventricular and aortic pressures are recorded via catheter transducers (Millar Mikro-Tip). The mean pressure gradient (mPG), peak pressure gradient (pPG), effective orifice area (EOA), and the regurgitation fraction (RF) are calculated. The hemodynamic data is averaged over 60 cardiac cycles and analyzed.

Table 3 shows hemodynamic data of the assembled PHVs where the LLDPE films have been heated under different durations during the thermoforming process. The results show that transcatheter aortic valve (TAV) can be easily assembled through thermoforming. The performance of the thermoformed TAV is comparable to FDA approved TAV. For comparison, the currently available devises, for example, the SAPIEN 3 (Edwards Lifesciences) of the same size has a mean EOA of 1.74±0.35 centimeter squared (cm$^2$) with an mPG of 10.59±3.88 mmHg. For the Evolut R (Medtronic) of the same size, mean EOA is 1.69±0.40 cm$^2$ with an mPG of 7.53±2.65 mmHg.

TABLE 3

| Thermoformed Duration (s) | Gradient (mmHg) | | Peak Gradient (mmHg) | | Effective Orifice Area (EOA) (cm$^2$) | | Regurgitant Fraction (RF) (%) | |
|---|---|---|---|---|---|---|---|---|
| | mean | std | mean | std | mean | std | mean | std |
| 60 | 11.81 | 0.43 | 18.98 | 0.74 | 1.76 | 0.04 | 53.80 | 0.69 |
| 30 | 8.77 | 0.28 | 13.18 | 0.24 | 1.72 | 0.06 | 14.39 | 0.85 |
| 20 | 8.39 | 0.34 | 14.57 | 0.28 | 1.80 | 0.07 | 13.88 | 0.79 |
| 18 | 9.45 | 0.26 | 12.72 | 0.41 | 1.69 | 0.04 | 36.05 | 0.71 |

In general, the lower (or lowest) gradients, the higher (highest) EOA, and the lower (lowest) RF are preferred. According to the ISO 8540, the minimum acceptable EOA for a 26-size valve is 1.58 if gradient is greater than 2 mmHg, and the regurgitant fraction needs to be less than or equal to 20%. In the illustrated examples shown in Table 3, the thermoformed durations of 20 s and 30 s seem to result in better performance of the assembled PHVs.

Figure 14:
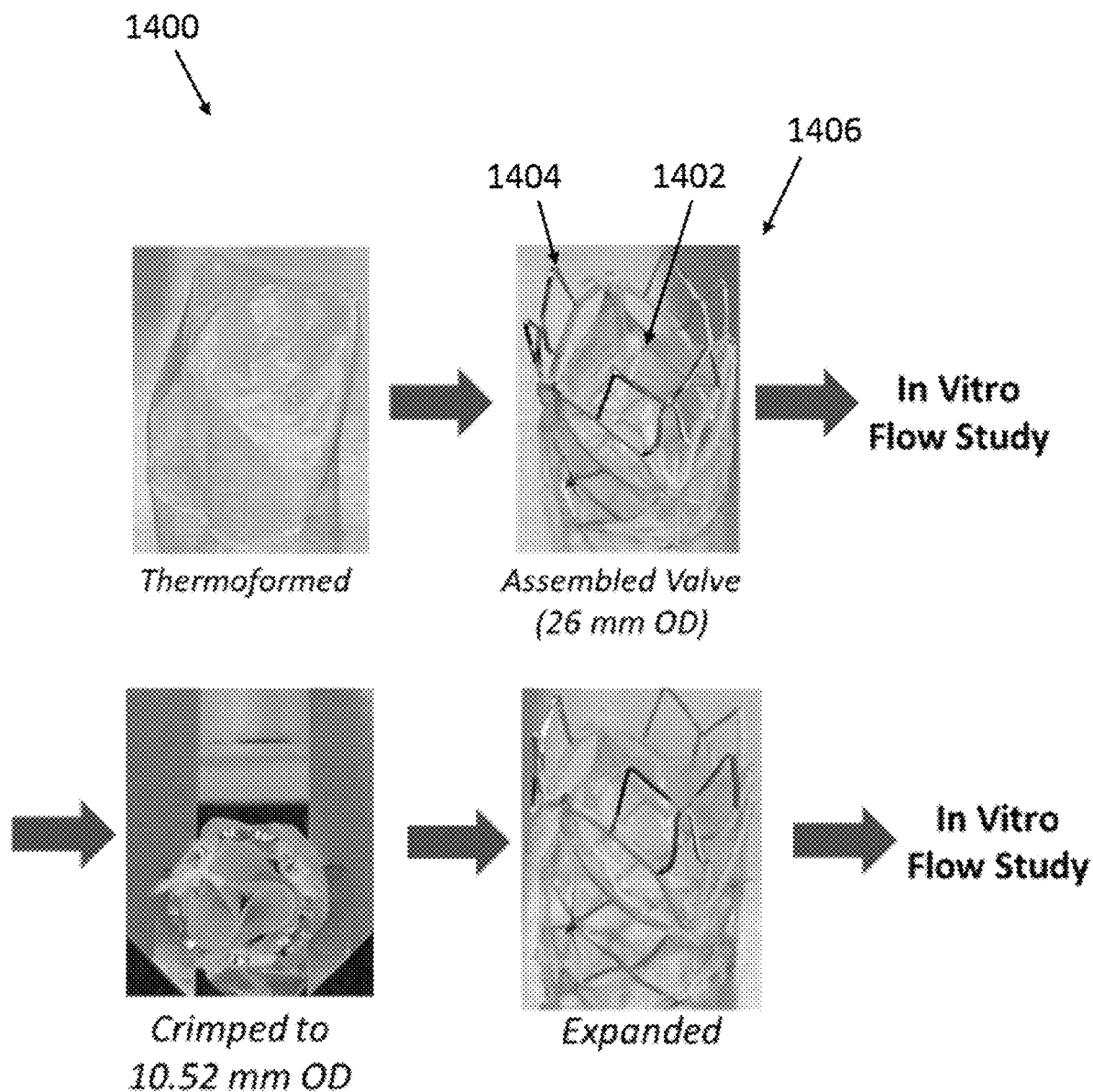
FIG. 14 shows an example testing process of crimping and expanding a PHV with thermoformed shaped leaflets.

Furthermore, the thermoformed PHVs disclosed herein are tested for transcatheter deployment. FIG. 14 shows an example process 1400 of an experiment testing the crimping and expanding of a PHV with thermoformed leaflets. The thermoformed leaflets 1402 are attached to the stent frame 1404, forming the assembled PHV 1406. In the illustrated example, the assembled PHV 1406 has an outside diameter (OD) of 22 millimeters (mm). The assembled PHV 1406 is subjected to an in-vitro flow study. Next, the assembled PHV 1406 is crimped to OD=10.52 mm, and subsequently expanded and subjected to an in-vitro study.

The hemodynamic performance of the assembled PHV 1406 is tested before crimping and after expanding, and Table 4 shows the hemodynamic data from the hemodynamic performance tests.

TABLE 4

| | Gradient (mmHg) | Peak Gradient (mmHg) | Effective Orifice Area (EOA) (cm$^2$) | Regurgitant Fraction (RF) (%) |
|---|---|---|---|---|
| Before Crimping | 6.73 | 9.95 | 1.91 | 15.2 |
| After Crimping/ Expanding | 6.06 | 9.65 | 1.77 | 16.7 |

Shock Absorber

Figure 15:
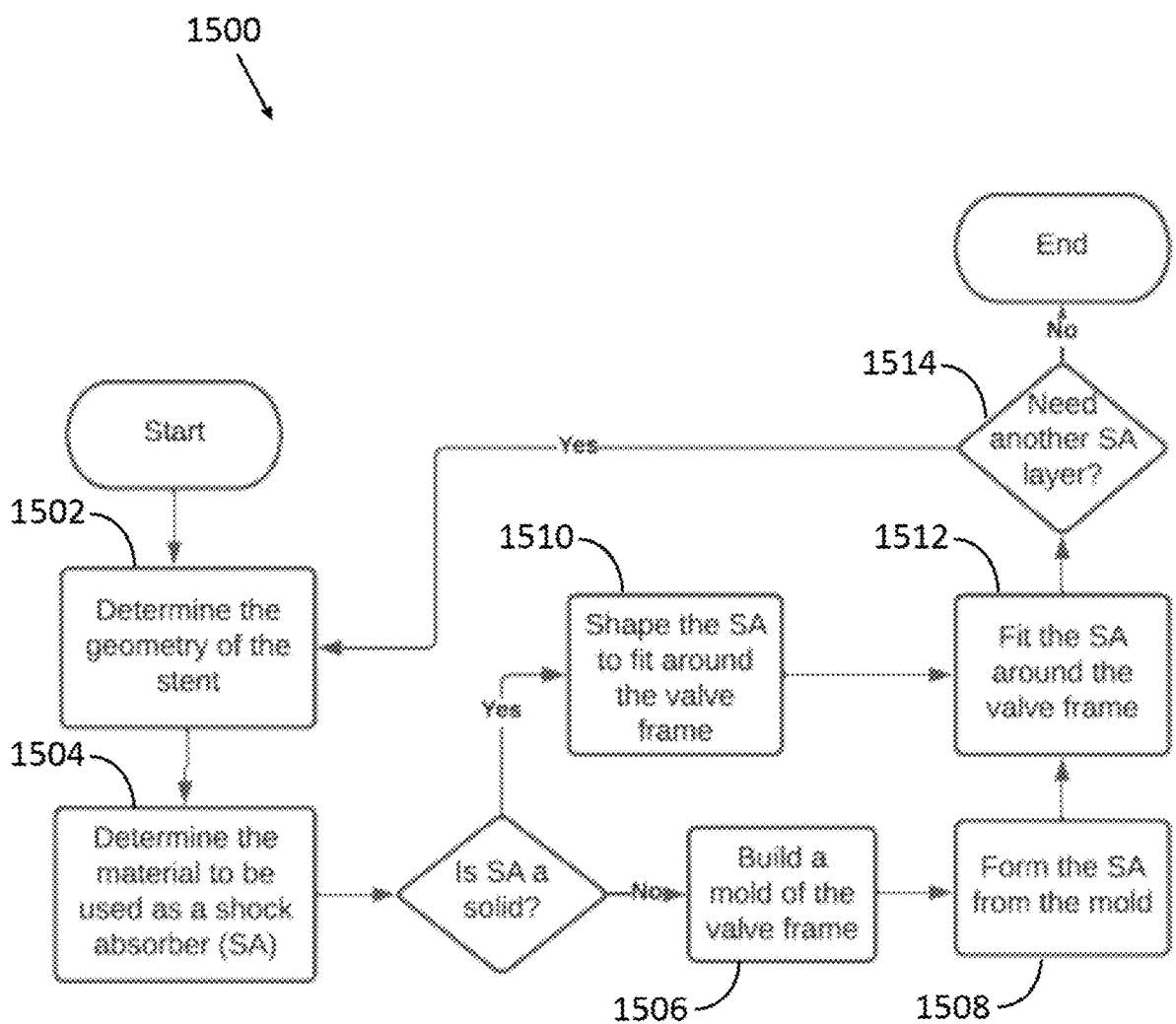
FIG. 15 shows an example method of incorporating one or more shock absorbers (SAs) onto a PHV.

Furthermore, the performance and durability of the PHVs disclosed herein may be enhanced by incorporating one or more shock absorbers (SA), e.g., dampener fabrications. FIG. 15 shows an example method (1500) of incorporating one or more SA onto a stent frame of a PHV. Method 1500 includes determining the geometry of the stent frame (step 1502) and determining the material to be used as a shock absorber (step 1504). The initial state of the SA can be either a solid or liquid.

Figure 16:
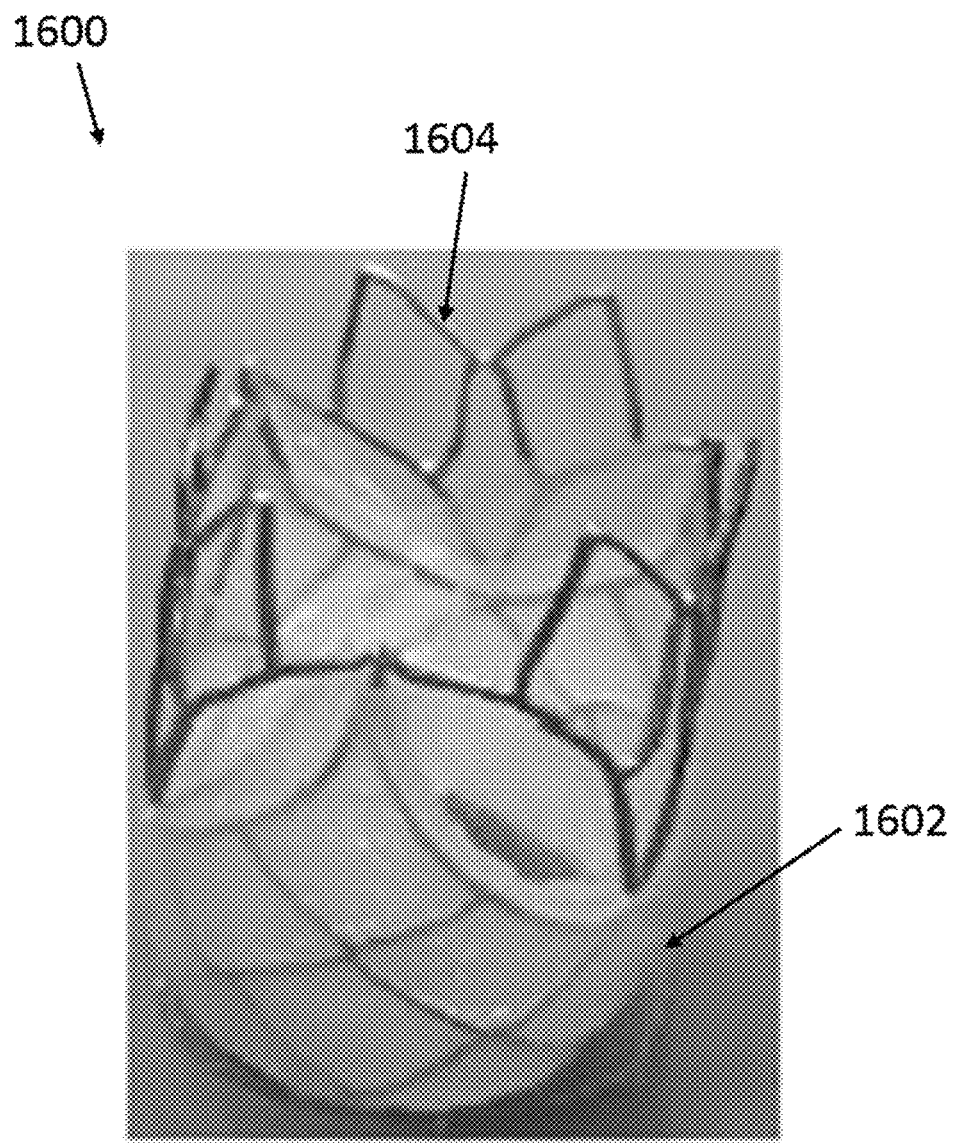
FIG. 16 shows an example image of a PHV with a layer of SA that is formed from a liquid state.

For SA started as a liquid, method 1500 includes building a mold of the stent frame (step 1506), forming the SA from the mold (step 1508), and fitting the SA around the stent frame (step 1512). The mold can be shaped to fit around the stent frame by casting a mold of the stent frame. The liquid SA can be solidified using the mold, and multiple layers of SA can be used. FIG. 16 shows an example of a PHV 1600 with a SA that started out as a liquid. In the illustrated example, the PHV 1600 has silicone as the SA 1602 wrapped around the stent frame 1604. The silicone is cured in a mold that trapped the silicone liquid around the stent frame 1604.

Figure 17:
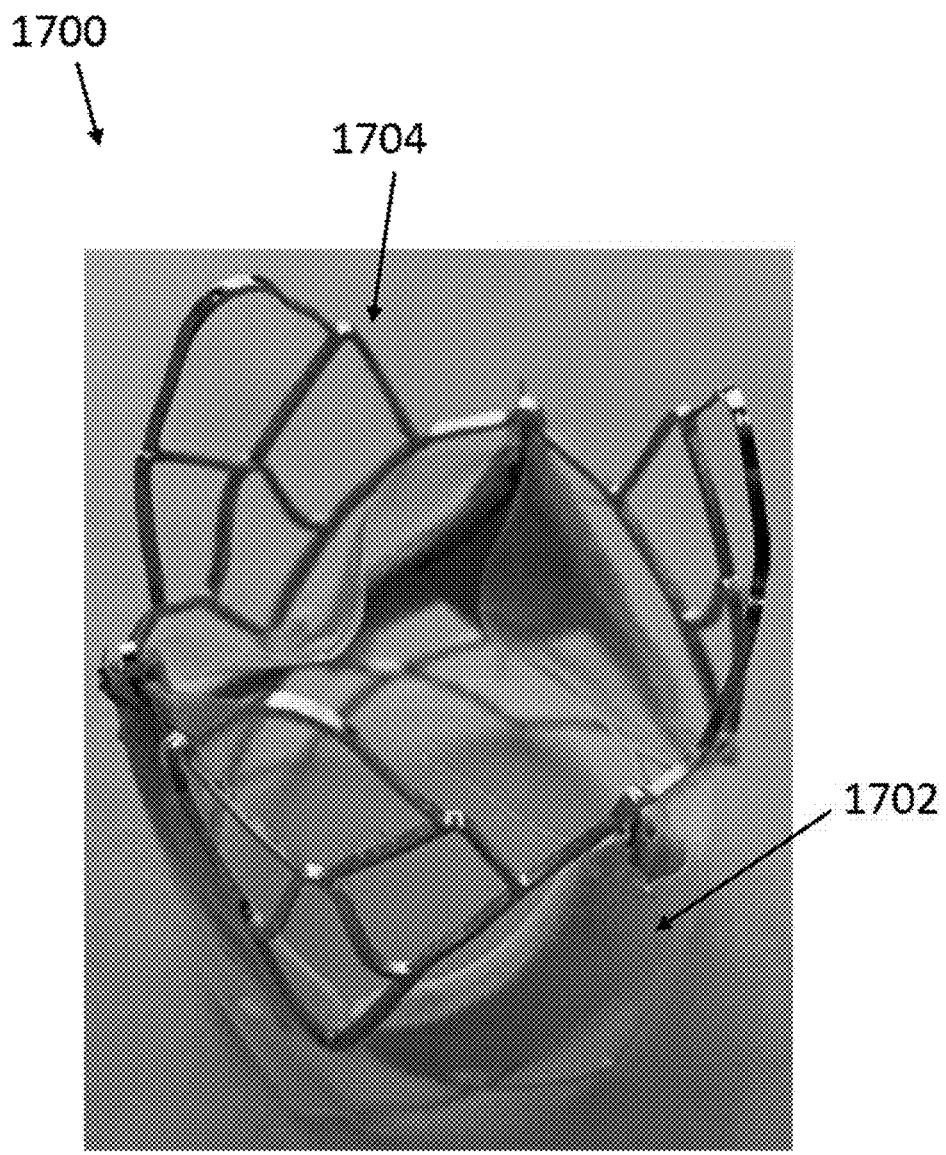
FIG. 17 shows an example image of a PHV with a layer of SA that is formed from a solid state.

For SA started as a solid, method 1500 includes shaping the SA to fit around the stent frame (step 1510) and fitting the SA around the stent frame (step 1512). FIG. 17 shows an example of a PHV 1700 with a SA layer 1702 that started out as a solid material, and the solid material is shaped and trimmed around the stent frame 1704.

Figure 18:
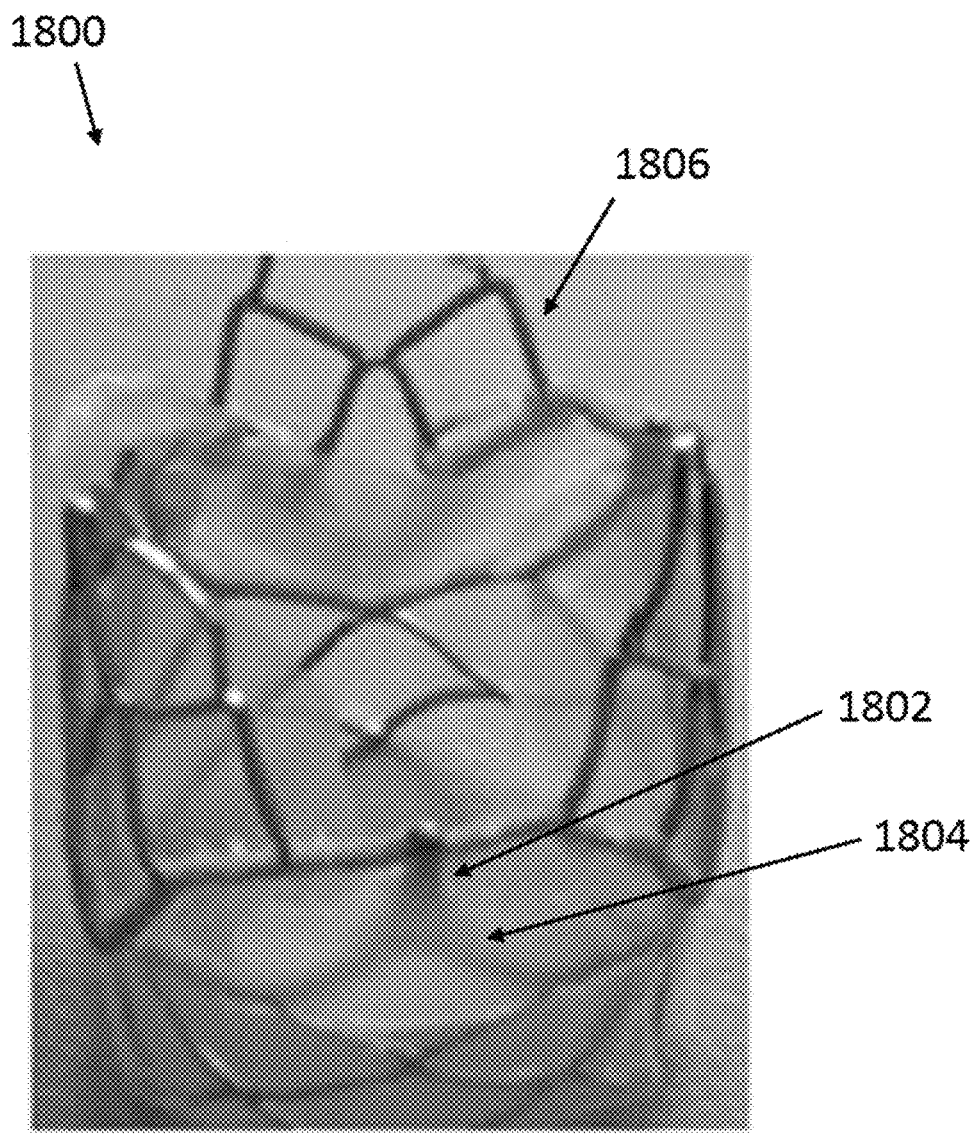
FIG. 18 shows an example image of a PHV with two layers of SAs.

Method 1500 may include determining if another SA is needed (step 1514). If it is determined that another SA layer is needed, method 1500 proceeds back to step 1502 from step 1512 to make and incorporate additional SA layers, (e.g., two, three, four, five SA layers, etc.) to the PHV. FIG. 18 shows an example of a PHV 1800 with two SA layers. The inner SA layer 1802 is a solid made of nylon, and the outer layer 1804 is silicone that is cured around the stent frame 1806. The PHV assembled based on method 1500 may include one or multiple SA layers, and the SA layers may be one or more solid layers, one or more cured layers from liquid, or a combination thereof.

The PHVs with the SA(s) assembled based on method 1500 are tested in an accelerated wear tester (AWT) with the minimum physiological peak pressure of 100 mmHg. The PHV 1600 in FIG. 16 lasts for 4.4 million cycles. The PHV 1700 in FIG. 17 lasts for 53 million cycles. The PHV 1800 in FIG. 18 with both SA materials (e.g., two SA layers) appears to be the most durable and lasts more than 178 million cycles. The AWT study demonstrates the effectiveness of utilizing SA.

FEM may be used in one or more of steps 1502 through 1514 to help optimizing the incorporation of SA layer(s) in a PHV. For example, FEM can be used to determine the material choice, geometry, and/or number of SA layers, at least based on the resulted stress distribution in the PHV.

Curtain Design

Figure 19:
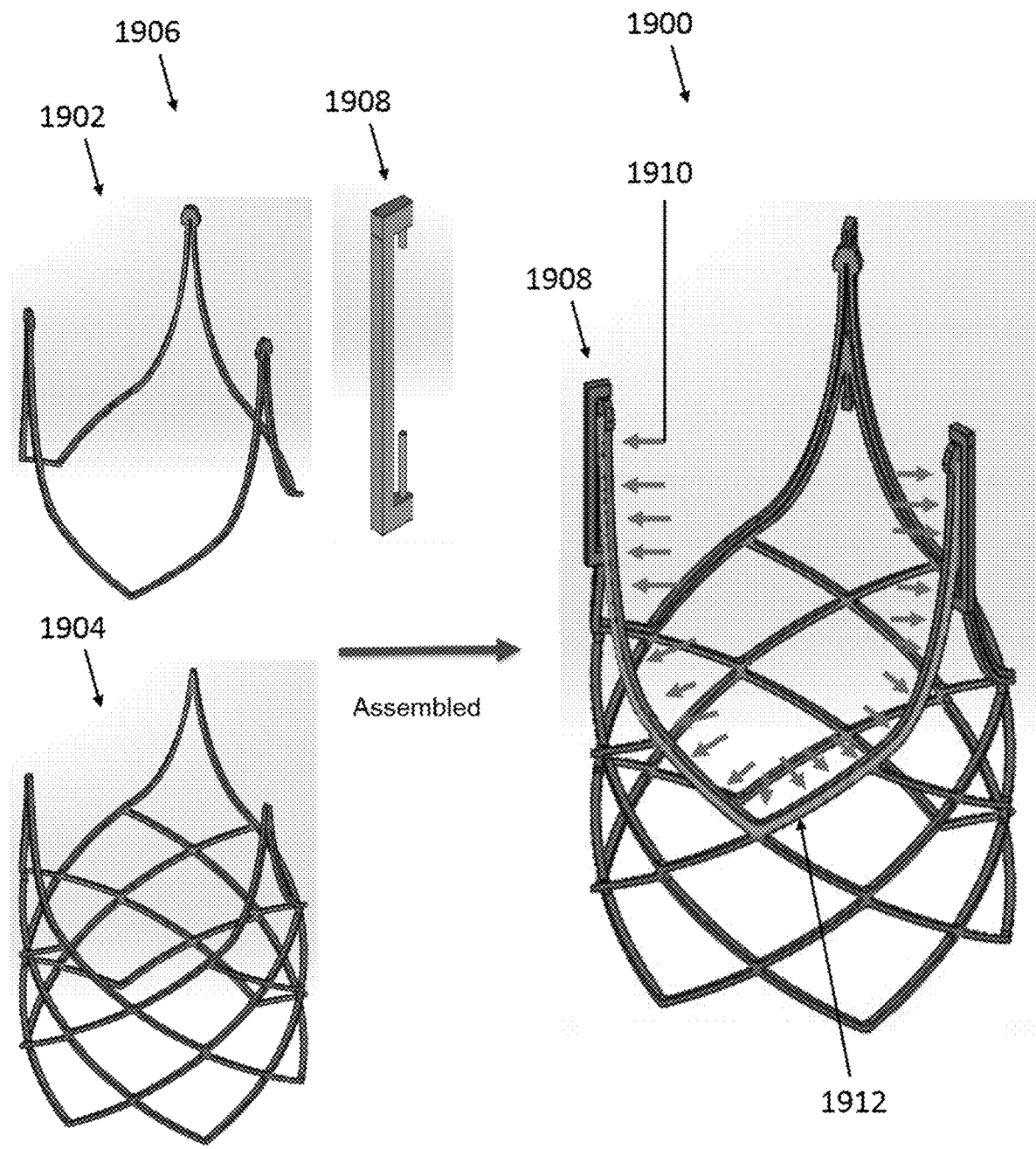
FIG. 19 shows an example curtain design for a PHV.

Furthermore, the performance and durability of the assembled PHVs disclosed herein may be enhanced by incorporating curtain design that could further reduce stress concentration on the leaflets. FIG. 19 shows an example of a curtain design for a PHV. The assembled PHV 1900 includes a top portion 1902 and a bottom portion 1904 of a stent frame 1906, and clamps 1908 configured to hold the top portion 1902 of the stent frame 1906 to anchor the leaflets (e.g., a 3D shaped polymeric leaflets) tightly along a fixed edge 1910 (indicated by small arrows). Specifically, the top portion 1902 and the bottom portion 1904 of the stent frame 1906 are attached via the clamps 1908 to form a gap 1912 for accommodating, fixing, and attaching the leaflets.

Figure 20:
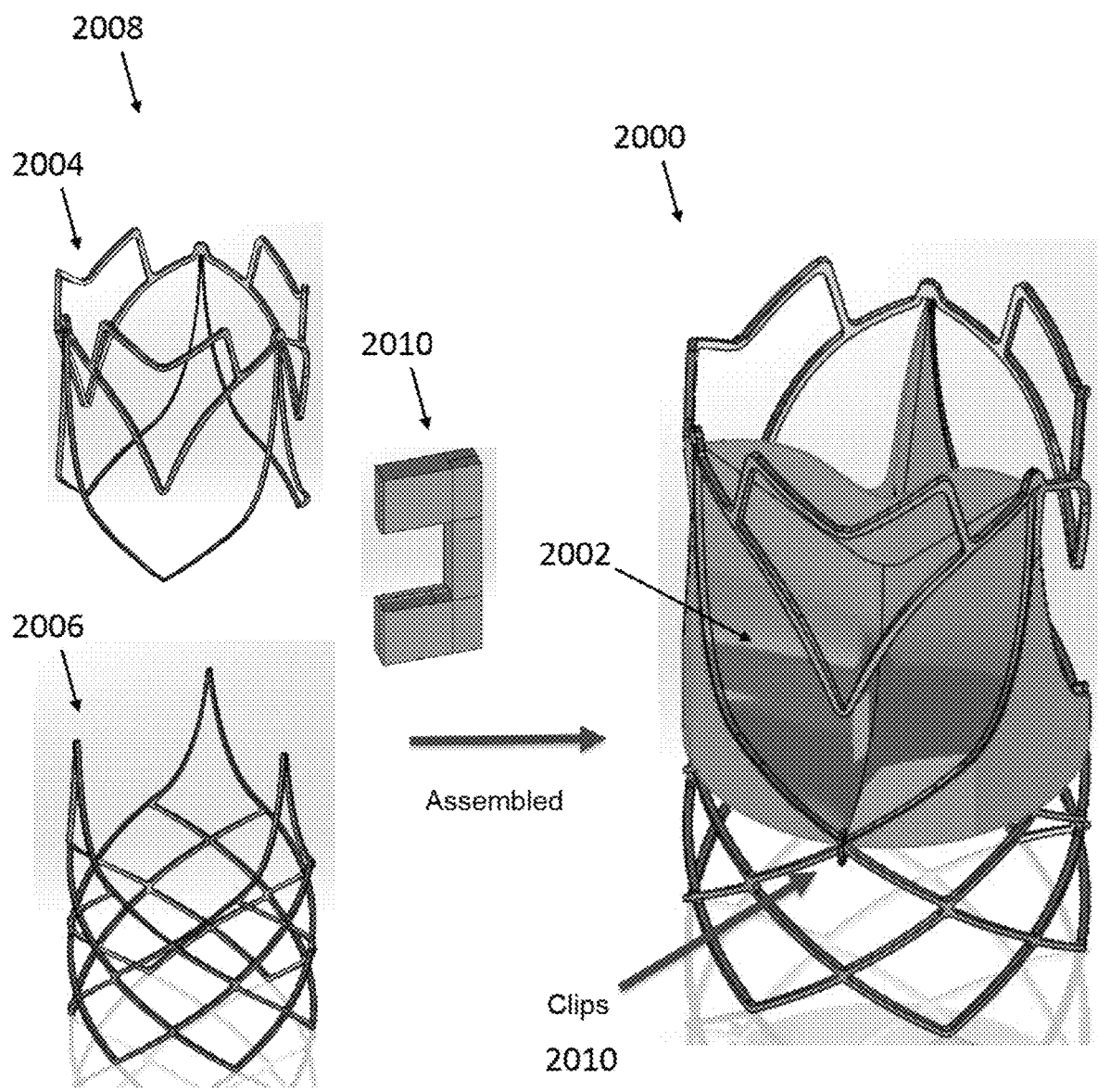
FIG. 20 shows another example curtain design for a PHV.

FIG. 20 shows another example of curtain design for a PHV 2000. The PHV 2000 is assembled from a 3D shaped polymeric leaflets 2002 anchored between a top portion 2004 and a bottom portion 2006 of a stent frame 2008 with clips 2010.

FEM may be used to help optimizing the incorporation of curtain design in a PHV. For example, FEM can be used to determine the material choice, geometry, location, and/or number of clamps and/or clips, at least based on the resulted stress distribution in the PHV.

Fiber Reinforcement

Furthermore, the performance and durability of the assembled PHVs disclosed herein may be enhanced by fiber reinforcement. In particular, the fiber reinforcement to the leaflets disclosed herein is configured to improve the leaflets' fatigue life and attachment to the stent frame. The PHVs disclosed herein may include fiber reinforcement to trace the stress concentrated lines in the leaflets to relax the leaflet peak stress significantly. The trace lines of high stress (e.g., locations where the fiber reinforcement is incorporated in the leaflets) may be mapped using FEM. The fiber reinforcement can be welded at the interleaflet triangle running through the commissure post and may stop at the end of the commissure post or may protrude from the commissure post. The protruding portion of the fiber reinforcement may be of the same dimension or thicker and/or stronger than the portion that runs through the commissure post.

The reinforcement can also comprise only another layer of stiffer and thicker LLDPE welded at the high stress regions by applied pressure and heat. Therefore, the terms fiber reinforcement and reinforcement can be interchangeable. Examples of high stress regions may include but are not limited to the interleaflet triangle, commissure post, and adjacent areas and lines along leaflet fixed edges (e.g., 308, FIG. 3) and the cusp's strategic location. One can use computational modeling (e.g., FEM or Artificial Intelligence) to optimize the strategic location of high stress regions for reinforcement. The strategic locations can be either bio-inspired or trace of high stress region.

The fiber reinforcement may be made of fiber or yarn of a diameter or characteristic width of less than 80 micrometers (μm) and may be melt-pressed within LLDPE to fabricate strategically reinforced flat film. In other iterations, the reinforcement may be made of fiber or yarn of diameter or characteristic width of higher than 80 micrometers (μm) and may be melt-pressed within two or three layers of LLDPE to fabricate strategically reinforced flat film. The film can then be thermoformed into a 3D shape to form the leaflets. The fiber reinforcement may be made of carbon fibers, ultra-high molecular weight polyethylene (Dyneema), P-phenylene-2, 6 benzobisoxazole (PBO), polyester, aramid fiber (Kevlar) or other types of polymeric fibers with a higher melting point than the leaflet materials.

Figure 21:
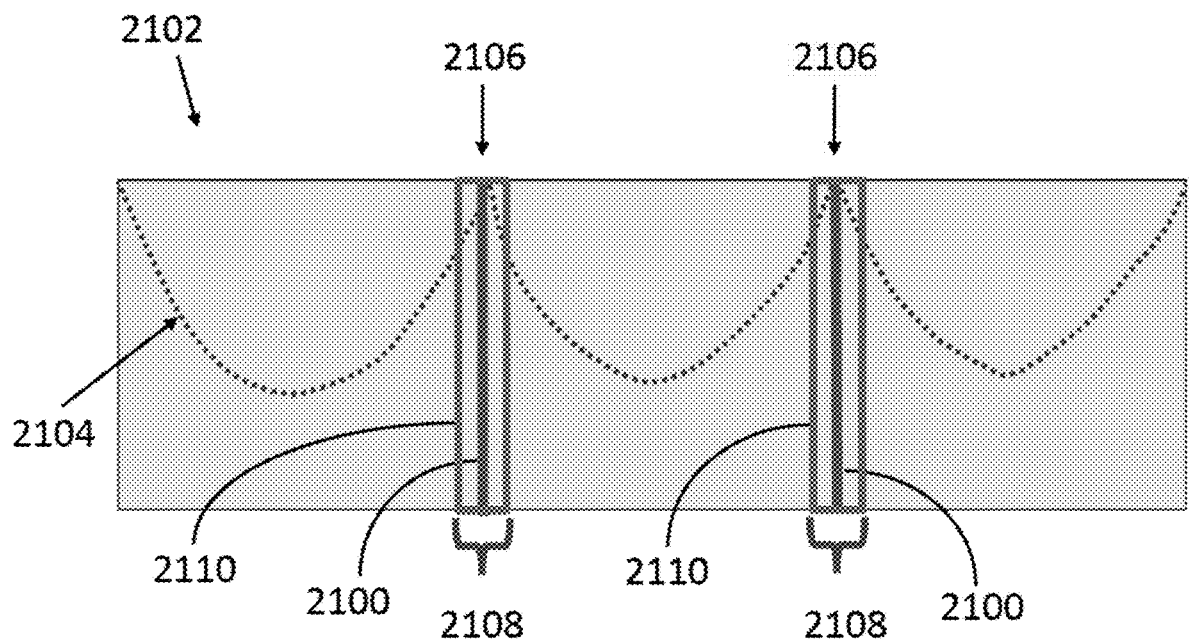
FIG. 21 shows an example illustration of fiber reinforcement in a leaflet of a PHV.

FIG. 21 shown an example of fiber reinforcement in a leaflet of a PHV. Fiber reinforcement 2100 can be incorporated in a leaflet 2102 (a leaflet film) when the leaflet 2102 is formed, e.g., in one process. The leaflet 2102 includes the 3D shaped leaflets 2104. The fiber reinforcement 2100 is along commissures 2106 between the leaflets 2104, along interleaflet regions 2108.

In addition to the fiber reinforcement 2100, a welded layer of fiber reinforcement 2110 may be welded outside of the fiber reinforcement 2100 such that the fiber reinforcement 2100 is sandwiched between two layers of the welded layer of fiber reinforcement 2110. The fiber reinforcement 2100 and the welded layer of fiber reinforcement 2110 are located in the interleaflet regions 2108. The fiber reinforcement 2100 and the welded layer of fiber reinforcement 2110 may be both made of LLDPE. In some embodiments, the fiber reinforcement 2100 may extend beyond the leaflet 2102, e.g., the reinforcement fiber is longer than the height of the leaflet, longer than the length of the commissures.

Figure 22:
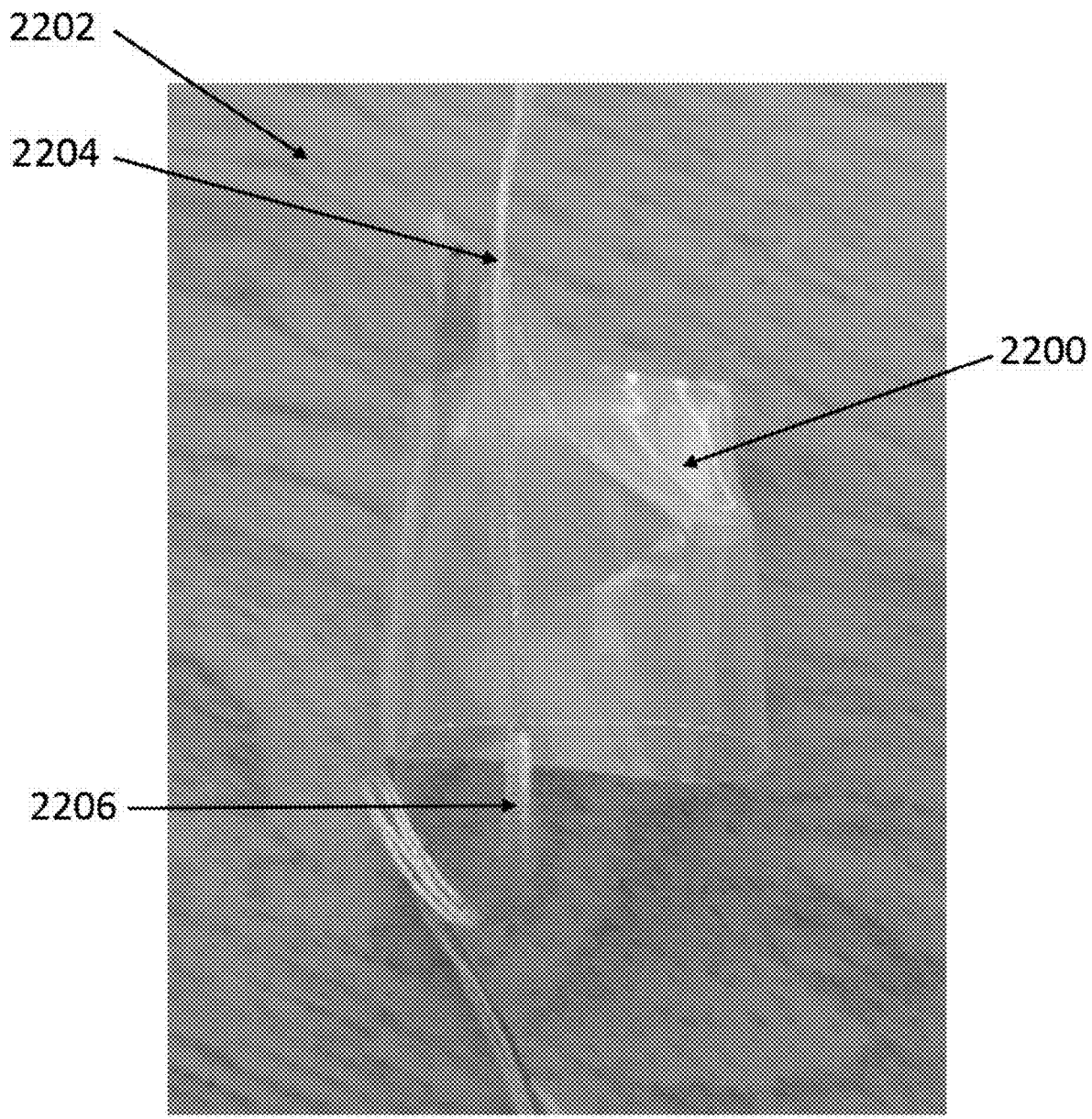
FIG. 22 shows an example image of PHV leaflet with fiber reinforcement.

FIG. 22 shows an example leaflets 2200 with fiber reinforcement 2202. The fiber reinforcement 2202 includes an embedded portion 2204 (e.g., the fiber reinforcement 2100 in FIG. 21) along the commissure and an extension portion 2206. In the illustrated example, the fiber reinforcement 2202 is made of polyester yarns. The LLDPE leaflet may be thermoformed according to methods discussed in FIG. 12. Then the fiber reinforcement 2202, e.g., the polyester thread, is laid over the commissure perpendicular to the height of the valve (e.g., the portion along the commissure 2204) and extending a few inches (e.g., the extension portion 2206). The fiber reinforcement 2202, e.g., the embedded portion 2204, is embedded within LLDPE by the applied pressure and heat. The embedded portion 2204 of the fiber reinforcement 2202 reinforces the commissure while the extension portion 2206 of the fiber reinforcement 2202 helps attaching the leaflets to the stent frame.

Figure 23:
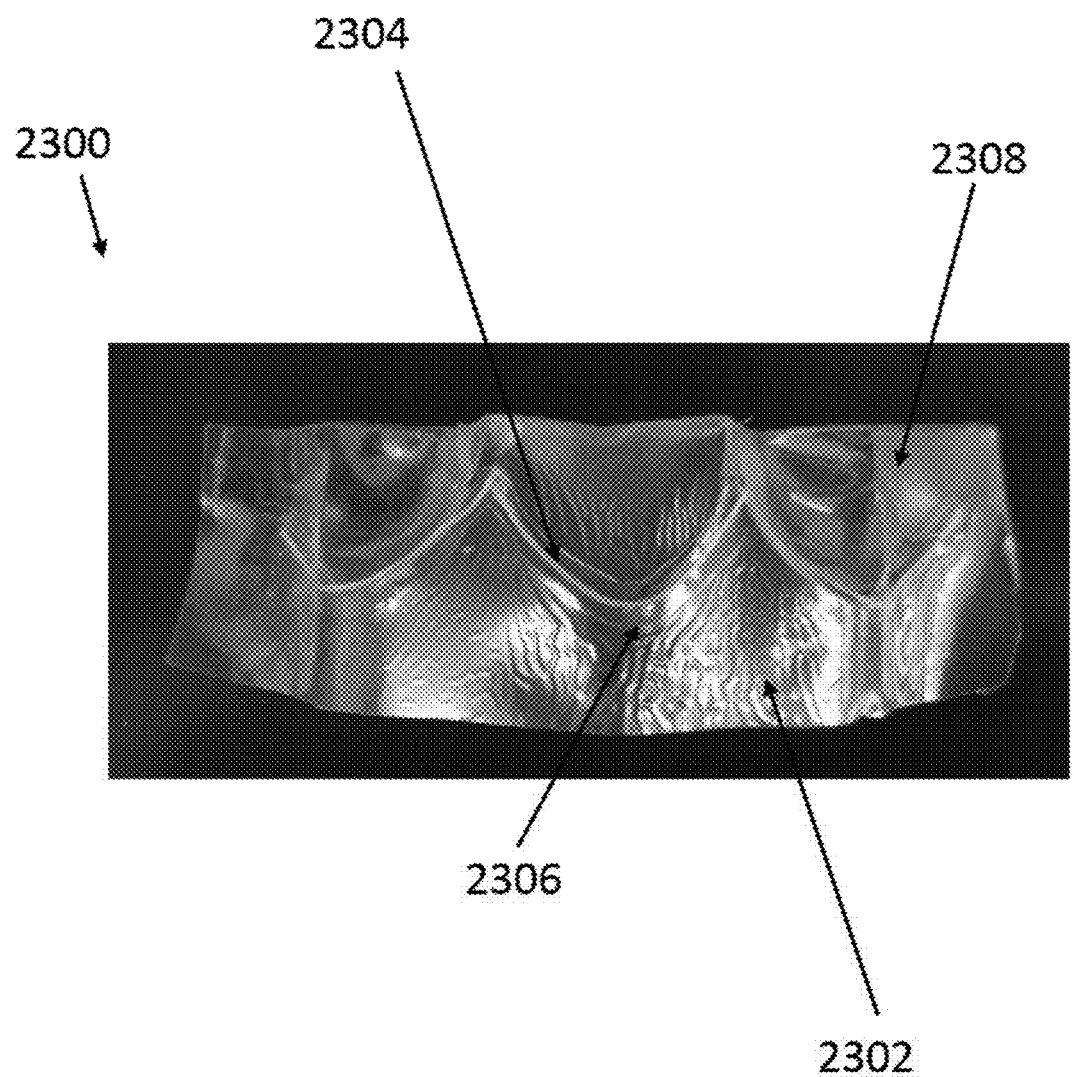
FIG. 23 shows another example image of PHV leaflet with fiber reinforcement.

FIG. 23 shows an example fiber-reinforced leaflet 2300 with the fiber reinforcement traces (along the high-stress line) along with the leaflet fixed edge (e.g., 308 of FIG. 3). In the illustrated example, the fiber reinforcement 2302 includes a polyester yarn 2304 and a welded layer 2306 (may be made of LLDPE). The polyester yarn is laid over the flat film (the leaflet material), and the welded layer 2306 is laid on top of the polyester yarn 2304 in such a way that the polyester yarn 2304 is sandwiched between the flat film (the leaflet material) and the welded layer 2306 by applied pressure and heat. This reinforcement can be achieved with automatic layup when the leaflet is formed e.g., one process. The reinforced LLDPE leaflet is thermoformed according to methods discussed in FIG. 12.

The invention claimed is:

1. A transcatheter prosthetic heart valve, comprising:
   a stent frame comprising a top portion and a bottom portion;
   a leaflet material comprising:
      a lower portion attached to the stent frame; and
      an upper portion comprising leaflets that are capable of moving between an open configuration and a closed configuration, wherein at least a portion of the leaflet material weaves through the stent frame; and
   one or more reinforcement components coupled to the stent frame and/or to the leaflet material to enhance performance of the transcatheter heart valve, wherein the one or more reinforcement components comprise fibers tracing stress-concentrated lines along the leaflets.

2. The transcatheter prosthetic heart valve of claim 1, wherein the leaflet material is shaped via thermoforming process.

3. The transcatheter prosthetic heart valve of claim 2, wherein the geometry of the leaflet material is determined based on based optimization using finite element modeling.

4. The transcatheter prosthetic heart valve of claim 2, wherein the thermoforming process comprises one or more steps of vacuum forming, pressure forming, molding, compressing, heating, annealing, tempering, cold working, and stretching.

5. The transcatheter prosthetic heart valve of claim 1, wherein the one or more reinforcement components comprise one or more shock absorbers wrapped around at least a portion of the stent frame.

6. The transcatheter prosthetic heart valve of claim 5, wherein the one or more shock absorbers are formed from a liquid state and molded to surround at least a portion of the stent frame.

7. The transcatheter prosthetic heart valve of claim 5, wherein the one or more shock absorbers are formed from a solid state and shaped to surround at least a portion of the stent frame.

8. The transcatheter prosthetic heart valve of claim 1, wherein the one or more reinforcement components comprise one or more clamps to hold the top portion and the bottom portion of the stent frame together with the leaflet material anchored between the top portion and the bottom portion of the stent frame.

9. The transcatheter prosthetic heart valve of claim 1, wherein the one or more reinforcement components comprise one or more clips that anchor the leaflet material between the top portion and the bottom portion of the stent frame.

10. The transcatheter prosthetic heart valve of claim 1, wherein the fibers comprise polymeric fibers having a melting point higher than the leaflet material.

11. The transcatheter prosthetic heart valve of claim 1, wherein the leaflets are thermoformed into a predetermined stress-free shape based on optimization using finite element modeling.

12. The transcatheter prosthetic heart valve of claim 1, wherein the leaflet material comprises one or more of polyolefin, polycarbonate, polypropylene, polystyrene, acetal, acrylic, acrylonitrile butadiene styrene.

13. The transcatheter prosthetic heart valve of claim 1, wherein the geometry of the stent frame is determined based on optimizations of a top angle at posts of the stent frame and a bottom angle at nadirs of the stent frame using finite element modeling.

14. The transcatheter prosthetic heart valve of claim 13, wherein the top angle is between 0° and 20° and the bottom angle is between 0° and 40°.

15. The transcatheter prosthetic heart valve of claim 1, wherein the fibers are made of one or more materials selected from carbon fibers, ultra-high molecular weight polyethylene, P-phenylene-2, 6 benzobisoxazole, polyester, and aramid fibers.

16. The transcatheter prosthetic heart valve of claim 1, wherein the stress-concentrated lines are mapped using finite element modeling.

17. The transcatheter prosthetic heart valve of claim 1, wherein a diameter or characteristic width of each of the fibers is greater than 0 micrometer and less than 80 micrometers.

18. The transcatheter prosthetic heart valve of claim 1, wherein the one or more reinforcement components comprise a fiber reinforcement layer along commissures between the leaflets or along interleaflet regions.

19. The transcatheter prosthetic heart valve of claim 18, wherein the one or more reinforcement components comprise one or more welded fiber reinforcement layers on one or both sides of the fiber reinforcement layer.

20. A transcatheter prosthetic heart valve, comprising:
a stent frame assembly comprising a top portion and a bottom portion;
a leaflet material comprising:
  a lower portion attached to the stent frame; and
  an upper portion comprising leaflets that are capable of moving between an open configuration and a closed configuration, wherein at least a portion of the leaflet material weaves through the stent frame assembly; and
one or more reinforcement components coupled to the stent frame assembly and/or to the leaflet material to enhance performance of the transcatheter heart valve, wherein the one or more reinforcement components comprise one or more clamps or clips to hold the top portion and the bottom portion of the stent frame assembly together with the leaflet material anchored between the top portion and the bottom portion of the stent frame assembly.

* * * * *